United States Patent
Jami et al.

(10) Patent No.: US 11,675,790 B1
(45) Date of Patent: Jun. 13, 2023

(54) COMPUTING COMPANY COMPETITOR PAIRS BY RULE BASED INFERENCE COMBINED WITH EMPIRICAL VALIDATION

(71) Applicant: Meltwater News International Holdings GmbH, Schaffhausen (CH)

(72) Inventors: Aditya Jami, San Francisco, CA (US); Jinsong Guo, London (GB); Eric Aichinger, Vienna (AT); Tim Furche, London (GB); Giovanni Grasso, London (GB); Jørn Lyseggen, San Francisco, CA (US); Markus Kröll, Vienna (AT); Stéphane Reissfelder, Cambridge (GB); Lukas Schweizer, Dresden (DE); Georg Gottlob, Oxford (GB)

(73) Assignee: MELTWATER NEWS INTERNATIONAL HOLDINGS GMBH, Schaffhausen (CH)

( * ) Notice: Subject to any disclaimer, the term of this patent is extended or adjusted under 35 U.S.C. 154(b) by 0 days.

(21) Appl. No.: 17/849,441

(22) Filed: Jun. 24, 2022

Related U.S. Application Data

(60) Provisional application No. 63/326,507, filed on Apr. 1, 2022.

(51) Int. Cl.
*G06F 16/2455* (2019.01)
*G06N 7/02* (2006.01)
(Continued)

(52) U.S. Cl.
CPC .... *G06F 16/24556* (2019.01); *G06F 16/2468* (2019.01); *G06F 16/24558* (2019.01);
(Continued)

(58) Field of Classification Search
None
See application file for complete search history.

(56) References Cited

U.S. PATENT DOCUMENTS

| | | |
|---|---|---|
| 7,117,163 B1 | 10/2006 | Iyer et al. |
| 7,350,187 B1 | 3/2008 | Tong et al. |
| (Continued) | | |

OTHER PUBLICATIONS

Implicit Business Competitor Inference Using Heterogeneous Knowledge Graph, Quin et al (Year: 2021).*

(Continued)

*Primary Examiner* — Augustine K. Obisesan
(74) *Attorney, Agent, or Firm* — Fresh Ip PLC; Clifford D. Hyra; John R. Bednarz

(57) ABSTRACT

Methods and systems for enriching an information system containing information about companies with additional competitor information. The information system, which could be a database, a knowledge base, or a knowledge graph, is assumed to contain information about a plurality of single companies, the information comprising data such as industry codes, competitors, and possibly also keywords for each company. The disclosed methods determine new competitor pairs by combining (i) the generation of new competitor candidate pairs by inference from existing competitors and other company-specific knowledge with (ii) the validation of such competitor candidates pairs by checking for joint occurrence in documents of a document repository.

22 Claims, 12 Drawing Sheets

(51) Int. Cl.
  *G06F 16/2458* (2019.01)
  *G06N 5/022* (2023.01)
  *G06N 5/025* (2023.01)
  *G06F 16/33* (2019.01)
  *G06F 18/21* (2023.01)

(52) U.S. Cl.
  CPC ........ *G06F 16/3334* (2019.01); *G06F 18/217* (2023.01); *G06N 5/022* (2013.01); *G06N 5/025* (2013.01); *G06N 7/02* (2013.01)

(56) References Cited

U.S. PATENT DOCUMENTS

| | | | |
|---|---|---|---|
| 7,899,701 B1 | 3/2011 | Odom | |
| 8,165,925 B2 | 4/2012 | Vailaya et al. | |
| 8,918,312 B1* | 12/2014 | Rehling | G06Q 30/0282 706/50 |
| 9,477,758 B1 | 10/2016 | Tong et al. | |
| 9,928,515 B2 | 3/2018 | Carvalho et al. | |
| 10,311,104 B2 | 6/2019 | Chiarandini et al. | |
| 10,504,127 B2 | 12/2019 | Carvalho | |
| 10,546,311 B1* | 1/2020 | Gupta | G06Q 30/0204 |
| 10,565,604 B2 | 2/2020 | Scotto et al. | |
| 10,664,534 B2 | 5/2020 | Surya et al. | |
| 11,232,117 B2 | 1/2022 | Mulder et al. | |
| 2003/0115216 A1* | 6/2003 | Moore | G06Q 10/0637 |
| 2009/0076784 A1* | 3/2009 | Ong | A63F 13/335 706/62 |
| 2015/0072791 A1* | 3/2015 | Batista Jerez | A63F 13/30 463/42 |
| 2015/0154613 A1* | 6/2015 | Ma | G06Q 30/0201 705/7.29 |
| 2019/0361925 A1* | 11/2019 | Rogynskyy | G06F 16/9535 |
| 2020/0050605 A1* | 2/2020 | Tung | G06F 16/2425 |
| 2020/0160362 A1* | 5/2020 | Gupta | G06Q 30/0204 |

OTHER PUBLICATIONS

Competitor Mining with the Web, Bao et al. (Year: 2008).*
Devlin et al. "Bert: Pre-training of deep bidirectional transformers for language understanding". In: arXiv preprint arXiv: 1810.04805 (2018), pp. 1-16.
Wallach. "Topic modeling: beyond bag-of-words". In: Proceedings of the 23rd international conference on Machine learning 2006, pp. 977-984.
Blei et al., "Latent dirichlet allocation," Journal of Machine Learning Research, Jan. 2003, pp. 993-1022.
Baykan et al. "Purely url-based topic classification," Proceedings of the 18th International Conference on World Wide Web. 2009, pp. 1109-1110.
Wei et al. "A method for topic classification of web pages using LDA-SVM model," Chinese Intelligent Automation Conference. Springer. 2017, pp. 589-596.
Qi et al., "Web page classification: Features and algorithms," ACM Computing Surveys (CSUR) 41.2 (2009), pp. 1-31.
Allahyari et al. "Text summarization techniques: a brief survey". ArXiv Preprint ArXiv: 1707.02268 (2017), pp. 1-9.
Nenkova et al., "A survey of text summarization techniques," Mining Text Data. Springer, 2012, pp. 43-76.
Cox, "The regression analysis of binary sequences," Journal of the Royal Statistical Society: Series B (Methodological) 20.2 (1958), pp. 215-232.
Xia et al. "Some hesitant fuzzy aggregation operators with their application in group decision making," Group Decision and Negotiation, 22.2 (2013), pp. 259-279.
Ralescu et al. "Extensions of fuzzy aggregation," Fuzzy Sets and Systems 86.3 (1997), pp. 321-330.
Liu et al., "Some q-rung orthopair fuzzy aggregation operators and their applications to multiple-attribute decision making," International Journal of Intelligent Systems, vol. 33.2 (2018), pp. 259-280.
Smolikova et al.,"Aggregation operators for selection problems," Fuzzy Sets and Systems, 131.1 (2002), pp. 23-34.
Ravana et al., "Score aggregation techniques in retrieval experimentation," Proceedings of the Twentieth Australasian Conference on Australasian Database, vol. 92. 2009, pp. 57-66.
Ciaccia et al., "FA+ TA< FSA: flexible score aggregation," Proceedings of the 27th ACM International Conference on Information and Knowledge Management, 2018, pp. 57-66.
Fagin et al.,"Optimal aggregation algorithms for middleware," Journal of Computer and System Sciences, vol. 66.4 (2003), pp. 614-656.
Fagin et al., "Efficient similarity search and classification via rank aggregation," Proceedings of the 2003 ACM SIGMOD International Conference on Management of Data. 2003, pp. 301-312.
Renda et al., "Web metasearch: rank vs. score based rank aggregation methods," Proceedings of the 2003 ACM Symposium on Applied Computing. 2003, pp. 841-846.
Van Eyk et al., "How to normalize cooccurrence data? An analysis of some well-known similarity measures," Journal of the American Society for Information Science and Technology, 60.8 (2009), pp. 1635-1651.
Kusner et al. "From word embeddings to document distances," International Conference on Machine Learning, PMLR. 2015, pp. 957-966.
Bottou, "Stochastic gradient descent tricks," Neural Networks: Tricks of the Trade, Springer, 2012, pp. 421-436.
Wang et al., "Language-independent set expansion of named entities using the web," Seventh IEEE International Conference on Data Mining (ICDM 2007), IEEE 2007, pp. 342-350.
He et al., "Seisa: set expansion by iterative similarity aggregation," Proceedings of the 20th International Conference on World Wide Web. 2011, pp. 427-436.
Wikipedia entry for 'Owler, https://en.wikipedia.org/wiki/Owler, retrieved on Jun. 28, 2022, pp. 1-5.
Official website of SerpAPI, https://serpapi.com/, accessed on Jun. 28, 2022, pp. 1-10.
Lanzinger et al., "MV-Datalog+-: Effective Rule-based Reasoning with Uncertain Observations". In arXiv: 2202.01718 (2022), pp. 1-18.
De Raedt et al.,"ProbLog: A Probabilistic Prolog and Its Application in Link Discovery." In: IJCAI vol. 7. Hyderabad. 2007, pp. 2462-2467.
Clark et al., "Managerial identification of competitors", Journal of Marketing 63.3 (1999), pp. 67-83.
Porac et al., "Taxonomic mental models in competitor definition". In: Academy of management Review 15.2 (1990), pp. 224-240.
Zheng et al., "From business intelligence to competitive intelligence: Inferring competitive measures using augmented site-centric data". In: Information Systems Research 23.3—part—1 (2012), pp. 698-720.
Akram et al., "A comprehensive way of finding Top-K competitors using C-Miner algorithm". In: International Research Journal of Engineering and Technology (IRJET) 5.3 (2018), pp. 1-4.
Rui Li et al., "Cominer: An effective algorithm for mining competitors from the web". In: Sixth International Conference on Data Mining (ICDM'06) IEEE. 2006, pp. 948-952.
Rui Li et al., "Web scale competitor discovery using mutual information". In: International Conference on Advanced Data Mining and Applications. Springer. 2006, pp. 798-808.
Pant et al., "Avoiding the blind spots: Competitor identification using web text and linkage structure". In: ICIS 2009 Proceedings (2009), p. 57.
Ruan et al., "Bootstrapping yahoo! finance by Wikipedia for competitor mining", Joint International Semantic Technology Conference. Springer. 2015, pp. 108-126.
Lin, Competitor Mining Using Customer Reviews. 2016, pp. 1-48.
Qin et al., "Implicit Business Competitor Inference Using Heterogeneous Knowledge Graph". In: 2021 IEEE International Conference on Big Knowledge (ICBK) IEEE. 2021, pp. 198-205.
Ruan et al., "A multi-strategy learning approach to competitor identification", Joint International Semantic Technology Conference. Springer. 2014, pp. 197-212.

(56) References Cited

OTHER PUBLICATIONS

Pant et al., "Web footprints of firms: Using online isomorphism for competitor identification". In: Information Systems Research 26.1 (2015), pp. 188-209.
Bao et al., "Competitor mining with the web". In: IEEE Transactions on Knowledge and Data Engineering 20.10 (2008), pp. 1297-1310.
Lappas et al., "Efficient and domaininvariant competitor mining". In: Proceedings of the 18th ACM SIGKDD International conference on Knowledge discovery and data mining. 2012, pp. 408-416.
Ma et al.,"Mining competitor relationshipsfrom online news: A network-based approach". In: Electronic Commerce Research and Applications 10.4 (2011), pp. 418-427.
Köseoglu et al. "Competitor intelligence and analysis (CIA) model and online reviews: integrating big data text mining with network analysis for strategic analysis". In: Tourism Review (2020), pp. 1-24.
Hong et al. "Competitor Mining from Web Encyclopedia: A Graph Embedding Approach". In: International Conference an Web Information Systems Engineering Springer 2020, pp. 56-68.
Ma et al., "A network-based approach to mining competitor relationships from online news". In: (2009), pp. 1-18.
Raut et al., "Competitor mining and identification from large unstructured datasets". In: 2018 3rd IEEE International Conference on Recent Trends in Electronics, Information & Communication Technology (RTEICT). IEEE. 2018, pp. 713-717.
Salunkhe, "Mining Social Networks for Business Competition Analysis". In: Asian Journal For Convergence In Technology (AJCT) ISSN-2350-1146 (2019), pp. 1-5.
Valkanas et al., "Mining competitors from large unstructured datasets". In: IEEE Transactions on Knowledge and Data Engineering 29.9 (2017), pp. 1971-1984.
Doan et al. "Mining business competitiveness from user visitation data". In: International Conference on Social Computing, Behavioral-Cultural Modeling, and Prediction. Springer. 2015, pp. 283-289.
Tkachenko et al., "Generative modeling of entity comparisons in text". In: Proceedings of the 23rd acm international conference on conference on information and knowledge management 2014, pp. 859-868.
Liu et al., "Mining product competitiveness by fusing multisource online information". In: Decision Support Systems 143(2021), p. 113477.
Xia et al. "CNME: a system for Chinese news meta-data extraction". In: Joint International Semantic Technology Conference. Springer. 2015, pp. 91-107.
Cilibrasi et al.,"The google similarity distance". In: IEEE Transactions on knowledge and data engineering 19.3 (2007), pp. 370-383.
Bollegala et al., "Measuring semantic similarity between words using web search engines." In: www 7.2007 (2007), pp. 757-766.
Damani et al.,"Improving pointwise mutual information (pmi) by incorporating significant co-occurrence". In: arXiv preprint arXiv:1307.0596 (2013), pp. 1-10.
Bellomarini et al., "The Vadalog system: datalog-based reasoning for knowledge graphs". In: Proceedings of the VLDB Endowment 11.9 (2018), pp. 975-987.
Joseph et al., "Top-K competitor trust mining and customer behavior investigation using data mining technique". In: Journal of Network Communications and Emerging Technologies (JNCET) 8.2 (2018), pp. 26-30.
Raman et al., "MultiGraph Attention Network for analyzing Company Relations". In: Proceedings of the 2019 8th International Conference on Computing and Pattern Recognition 2019, pp. 426-433.
Chen et al. "Upstream, Downstream or Competitor? Detecting Company Relations for Commercial Activities". In: International Conference on Human-Computer Interaction. Springer. 2019, pp. 42-52.
Metropolis et al.,"The monte cario method". In: Journal of the American statistical association 44.247 (1949), pp. 335-341.
"Vadalog User Manual—Vadalog Version 1.0.0". In: DeepReason.ai (2021). url: https://www.dropbox.com/s/0hlncfw1supvyj6/vadalog_manual.pdf?dl=0, pp. 1-37.
Bellomarini et al. "Knowledge graphs and enterprise AI: the promise of an enabling technology". In: 2019 IEEE 35th International Conference on Data Engineering (ICDE). IEEE. 2019, pp. 26-37.
Bellomarini et al. "Swift Logic for Big Data and Knowledge Graphs". In: IJCAI, 2017, pp. 1-14.
Silva Rosa et al. "Competition in the market for takeover advisers". In: Australian Journal of Management 29.1_suppl (2004), pp. 61-92.
Shkapsky et al., "Optimizing recursive queries with monotonic aggregates in deals". In: 2015 IEEE 31st International Conference on Data Engineering. IEEE. 2015, pp. 867-878.
Ceri et al., "Logic programming and databases" Springer Science & Business Media, 2012, pp. 1-294.
Ceri et al. "What you always wanted to know about Datalog(and never dared to ask)". In: IEEE transactions on knowledge and data engineering 1.1 (1989), pp. 146-166.
Deransart et al., "Prolog: the standard: reference manual", Springer Science & Business Media, 2012, pp. 1-283.
Coelho et al.,"How to Solve it with Prolog", LNEC, 1985, pp. 1-223.
Clocksin et al., "Programming in PROLOG," Springer Science & Business Media, 2003, pp. 1-13.
Leone et al. "The DLV system for knowledge representation and reasoning".In: ACM Transactions on Computational Logic (TOCL) 7.3 (2006), pp. 499-562.
Gebser et al. "clasp: A conflict-driven answer set solver". In: International Conference on Logic Programming and Nonmonotonic Reasoning. Springer. 2007, pp. 260-265.
Niemela et al., "Smodels—an implementation of the stable model and well-founded semantics for normal logic programs". In: International Conference on Logic Programming and NonMonotonic Reasoning, Springer. 1997, pp. 420-429.
Brewka et al., "Answer set programming at a glance". In: Communications of the ACM 54.12 (2011), pp. 92-103.

* cited by examiner

420 — CompSector(CompID, Sector)

| CompID | Sector |
|---|---|
| 1596 | 5661 |
| 2367 | 5661 |
| 6622 | 5651 |
| 5699 | 5661 |
| 5638 | 5661 |
| 1289 | 5661 |
| 6812 | 5651 |
| ... | ... |

440 — CompName(CompID, CompName)

| CompID | CompName |
|---|---|
| 1596 | NIKE |
| 2367 | Adidas |
| 6622 | Under Armour |
| 5699 | Red Wing |
| 5638 | Clarks |
| 1289 | New Balance |
| 6812 | Moncler |
| ... | ... |

460 — CompatSec(Si, Sj, f*(Si, Sj))

| Si | Sj | f*(Si, Sj) |
|---|---|---|
| 5661 | 5651 | 0.9375 |
| 5661 | 3171 | 0.9375 |
| ... | ... | ... |

480 — Competitor(CID1, CID2, ProxScore)

| CID1 | CID2 | ProxScore |
|---|---|---|
| 1596 | 2367 | 99000 |
| 6622 | 1596 | 88050 |
| 1596 | 1289 | 76000 |
| 5638 | 5699 | 86560 |
| 6622 | 6812 | 75390 |
| 1289 | 2367 | 79120 |
| ... | ... | ... |

FIG.4

| CompSector(CompID, Sector) 420 | |
|---|---|
| CompID | Sector (SIC code) |
| 1596 | 5661 |
| 6622 | 5651 |
| 2367 | 5661 |
| ... | ... |

| CompName(CompID, CompName) 440 | |
|---|---|
| CompID | CompName |
| 1596 | NIKE |
| 2367 | Adidas |
| 6622 | Under Armour |
| ... | ... |

| CompatSec(Si, Sj, f*(Si, Sj)) 460 | | |
|---|---|---|
| Si | Sj | f*(Si, Sj) |
| 5661 | 5651 | 0.9375 |
| ... | ... | ... |
| | | |

| Competitor(CID1, CID2, ProxScore) 480 | | |
|---|---|---|
| CID1 | CID2 | ProxScore |
| 1596 | 2367 | 99000 |
| 6622 | 1596 | 88050 |
| ... | ... | ... |

FIG.6b

```
Cand(CID1,CID2,PScore):-
    Competitor(CID1,CID2,PScore).
Cand(CID1,CID3,PScore):-
    Cand(CID1,CID2,PS12),
    Competitor(CID2,CID3,PS23),
    CompSector(CID1,SEC1),
    CompSector(CID3,SEC3),
    CID1 != CID3,
    CompatSec(SEC1,SEC3,SeCoScore),
    Penalty(A), Cutoff(B),
    PScore=
    max((PS12+PS23-100000-A)*SeCoScore),
    PScore>B.
```

FIG.6c

Queries of Query Type I:
q1: "Skechers" OR "ASICS" OR "Puma" OR "Converse" OR "Vans" "NIKE" "Under Armour"
q1*: "Reebok" OR "Kappa" OR "VF" OR "Converse" OR "Vans" "NIKE" "Under Armour"

Queries of Query Type II:
q2_1: "Skechers" OR "ASICS" OR "Puma" OR "Converse" OR "Vans" "NIKE" "ARKADIUM"
q2_2: "Skechers" OR "ASICS" OR "Puma" OR "Converse" OR "Vans" "NIKE" "Evian"
q2_3: "Skechers" OR "ASICS" OR "Puma" OR "Converse" OR "Vans" "NIKE" "Altria"

q2*_1: "Reebok" OR "Kappa" OR "VF" OR "Converse" OR "Vans" "Under Armour" "Tesla"
q2*_2: "Reebok" OR "Kappa" OR "VF" OR "Converse" OR "Vans" "Under Armour" "Microsoft"
q2*_3: "Reebok" OR "Kappa" OR "VF" OR "Converse" OR "Vans" "Under Armour" "SIEMENS"

FIG. 7

COMPUTING COMPANY COMPETITOR PAIRS BY RULE BASED INFERENCE COMBINED WITH EMPIRICAL VALIDATION

CROSS REFERENCE TO RELATED APPLICATION

This application claims priority from U.S. Application No. 63/326,507 filed on Apr. 1, 2022, entitled "COMPUTING COMPANY COMPETITOR PAIRS BY RULE BASED INFERENCE COMBINED WITH EMPIRICAL VALIDATION" which is hereby incorporated by reference in its entirety.

FIELD

This disclosure teaches methods, techniques, and systems related in general to the field of information processing. More specifically, the disclosure relates to the automatic enrichment of companies information systems, that is, information systems containing data about a plurality of companies, including competitor information. It is shown how new competitors of a company can be computed based on known ones.

BACKGROUND

Companies Information Systems

The term "companies information system" (CIS) herein designates an information system that stores data about a plurality (usually, a very large number) of companies, and possibly other relevant data, in electronic form and offers one or more interfaces for inserting, querying, and updating such data. In this disclosure, the term "companies" is used in a broad sense, covering all kind of business entities, but also organizations, institutions, charities, and so on. The data about companies stored in a CIS are referred to as (factual) "knowledge" about this company. Rules used to infer further knowledge from existing knowledge are referred to as "knowledge based rules", and sets of such rules constitute "rule-based knowledge".

The following systems, when holding data about companies, as well as their combinations into a single system, are particular types of CIS:
  database management systems (DBMS),
  knowledge bases that store facts and rules in logical form.
  knowledge graphs, which are often defined as knowledge bases whose factual data are in some sense graph-structured (for example, RDF stores). However, more modern definitions of knowledge graphs do not actually require graph-structured storage. For example, a knowledge graph can be characterized as a "large network of entities, and instances for those entities, describing real world objects and their interrelations, with specific reference to a domain or to an organization".

A well-known example of a CIS is Owler which stores data about millions of companies. A part of Owler is its "Competitive Graph" which associates to each company a set of competitors. Owler's Competitive Graph is often referred to as a knowledge graph.

Compatible Company Sectors

Companies information systems frequently associate one or more industry sectors (short: sectors) with each (or most) companies. These sectors can be indicated by sector codes, such as a SIC or NAIC, or D&B codes. Sometimes, for some CIS, such as Owler, plain sector names instead of sector codes are used.

Usually, when a CIS stores competitor and sector information, then many (but not necessarily all) competitors of a company C share a sector with C, i.e., that is, if C' is a competitor of C, then the intersection of the set of sectors of C with the set of the sectors of C' is non-empty. However, it happens frequently enough that C' is a competitor of C, and these companies do not share a sector, but C has a sector S and C' has a sector S' and S and S' are compatible, which means that they are overlapping with respect to products or services. However, when two sectors S and S' are compatible, this does not mean that each company in S is a competitor of each company in S'. This follows already from the fact that even if two companies belong to the same sector, this does not at all mean that they are competitors.

Document Repository

The term "document repository" shall be interpreted to its broadest possible extent throughout the descriptions herein. In various embodiments, it may include one system or a combination or an integration of systems from a group of systems comprising: (a) the World Wide Web, (b) an intranet or a federation of intranets, (c) a document management system, (d) an electronically searchable document or library catalog with links to online documents or to electronically stored documents, (e) a full-text database, (f) a database that stores text fields and that can retrieve texts via a suitable query language, (g) a searchable content management system, (h) a social network, where user posts are regarded as documents, (i) an image repository retrievable by an image search facility retrieving images from documents, (j) a log management system of Web search queries.

The document repository must be searchable. The search functionality may be provided by the underlying system used to store the document repository, such as a database system. It may also be provided by some external search tool, such as a Web search engine. Each search result corresponds to a document matching the search criteria, and it comprises, in addition, the following information: (i) a unique identifier locating the document in the document repository, such as the URL of a Web page; (ii) the title of the document; (iii) a summarization of the document, such as a snippet or associated keywords of the document. All such information contained in a search result is easily accessible by other procedures, and the search results can be analysed and counted without inspecting the matched documents.

Rules and Inference

A system embodying the present disclosure performs logical-rule-based inference tasks (a.k.a. reasoning tasks) in order to infer candidate pairs of competing companies (also referred-to as "candidate competitor pairs"). Such inference tasks are performed by an appropriate inference engine that applies logical rules to already ascertained facts (originally given or derived) to derive new facts.

Logical facts and rules may be expressed in various formalisms in different embodiments. As described further below, logical rules are expressed in the Vadalog language, specifically in Vadalog 1.0.0 version. In other embodiments, a logical rule may be expressed by a classical logic programming language such as Prolog or yet other formalisms. It may also be expressed in an extended formalism that supports one or more advanced inference features such as fuzzy inference, probabilistic inference, and so on. A further discussion of logical languages with various examples of possible languages is given in the "Alternative Rule Languages" section. For each logical language, an appropriate inference engine operating on facts and rules of that language shall be used.

Rules and rule processing, in particular, logical rules and logical inference are useful to decision processes involved in the competitor pair generation process. For example, the process of selecting pairs (A,B) and (B,C) of competing companies and of generating a new candidate competitor pair (A,C), provided some additional constraints are satisfied, can be performed via logical rules as described in the "Generation of Competitor Candidates" section in the context of a specific embodiment.

Some logical languages such as Datalog or Vadalog, can directly access and update relational databases by identifying database tuples $<a_1, \ldots, a_r>$ of an r-ary relation R with logical facts of the form $R(a_1, \ldots, a_r)$.

Knowledge-Based Competitor Generation

Competitors are often generated and stored manually by a crowd of business experts (as with Owler). Manual competitor generation, which is the most elementary way of solving the competitor generation and validation problems, usually requires human experts who are familiar with a particular industry sector to design mental representations (a.k.a. cognitive representations) of competitors in that industry sector. Such mental representations of competitors usually use various attributes, such as company sector codes. The meticulously constructed representations are used to classify candidate companies as competitors or not. Such methods are time-consuming and expensive, as they often require lengthy web searches and multiple iterations of modifications to the mental representations until reasonable results are obtained. Moreover, such mental representations of competitors in a particular industry sector are not reusable for generating competitors in other industry sectors. In contrast, although the disclosure also utilizes companies' sector codes (as described in the "Generation of Competitor Candidates" section), it applies to generating competitors in any industry sector.

To reduce human effort in the competitor generation process, several methods were proposed that automatically identify competitors based on knowledge about companies. Knowledge about companies in these methods includes two main types: human knowledge about competition relationships and the factual knowledge or data about companies (see the "Companies Information Systems" section). The former is usually defines the competition relationships, while the latter is used in the competitor computation processes.

According to different human knowledge about competition relationships, different knowledge-based methods define competition relationships differently. Accordingly, different methods address the competitor generation problem from different perspectives using different types of factual knowledge about companies. For example, some methods define the competition relationship of two companies based on the amount of overlapping user segments in which two companies compete with each other. Each user segment is associated with a set of product or service features that the users in the segment want. A company covering a particular user segment should cover all the features associated with that user segment. Thus, such methods require knowing the companies' product or service features and using this type of factual knowledge about companies in the competitor computation processes. Similarly, some method applies data mining techniques to investigate the customer information on social networks to mine competitors.

Rather than defining competitive relationships in terms of user segments, some other methods exploit the "isomorphism of competitors", i.e., the phenomenon of competing companies behaving in similar ways (as they mimic each other under common market forces). For example, some methods exploit a particular type of online isomorphism that the web footprints (e.g., in-links and out-links) of the competing companies' websites usually significantly overlap. The geographic isomorphism of locations patterns of competing companies is also used by some methods. They evaluates the competition of two companies based on their customer visitation data.

There are also some methods that adopt graph networks to represent the relationships between companies, such as suppliers, customers, etc., and apply machine learning techniques to predict competitors. Some method leverages implicit features of competitors contained in a heterogeneous enterprise knowledge graph. Such implicit features of a pair of competitors A and B are detected by finding similarities among various properties or attribute-values of A and B, including structured information (e.g., Product Analysis, Sales Territory), and unstructured information (e.g., Business Scope).

These knowledge-based methods have several limitations. Some of these methods can only apply to particular domains. For example, those based on customer visitation data only apply to companies selling products in physical stores. More significantly, the factual knowledge of companies used by these methods, such as the companies' product/service features, company relationship data, and customer visitation data, are often not available due to many possible reasons, such as the lack of data sources or the data usage regulations. Furthermore, the results of these methods are not validated by further steps and are thus unreliable for practical use, especially when the knowledge required by these methods is incomplete.

Another method of knowledge-based competitor generation, described in the "Generation of Competitor Candidates" section of the present disclosure, generates new competitor relationships from existing ones in a knowledge graph, mainly by a constrained transitivity rule. Unfortunately, the assumption of a precise and complete knowledge graph is unrealistic. Moreover, knowledge-based inference is not perfect, and knowledge-based inference rules do not always produce correct results. To improve the precision of knowledge-based competitor generation methods, it is thus useful to submit newly derived competitor pairs (A,B) to a further empirical validation step before adding them to a CIS. Existing methods of empirical validation are described in the "Empirical Competitor Validation" section.

For known competitor pairs, degrees of competitiveness can be assigned by calculations adopting various key criteria, such as industry sectors and market shares of two companies. Further measurement criteria usually rely on data aggregated for each company, such as the number of transactions conducted by each of the competing firms in the market. However, the required data may be unavailable, which is a significant limitation of such methods.

Empirical Competitor Validation

Several previous publications have addressed the Competition validation problem (also known as the "Competitiveness Evaluation Problem") which consists of checking whether two given companies are competitors based on empirical evidence. This problem is tightly related to, and is a part of, the problem of generating competitors based on empirical tests such as co-occurrence statistics in document corpora.

A significant body of previous work identifies competitors based on probing the Web or other document corpora to find explicit features directly indicating competition relationships or indicating competition-relevant relationships.

Some of these methods look for so-called comparative phrases, i.e., specific phrases with text patterns explicitly indicating competition-related relationships. For example, these methods may detect competition-relevant relationships such as a comparison relationship between company A and company B based on a phrase "A vs. B", or a substitution relationship between company A and company B such as "A's alternatives include B, . . . ", and so on. Despite the effectiveness of all such explicit features, a strong limitation is that these explicit features often may not be available.

In many cases, competitors may only co-occur on some Web page or in some other document implicitly without any explicit features. For example, Apple and Samsung, two companies competing with each other in the cell phone market, may co-occur in a list of brands of a shopping website, where the competition relationship is implicitly indicated by the content of the list. Two seafood restaurants, The Oystermen and Wright Brothers, which are competitors of each other, may appear in different paragraphs of an article recommending restaurants in London, where the competition relationship is implicitly indicated by the theme of the article.

Corpus-based validation methods for already computed pairs (A,B) of competitor pairs may simply rely on similarity measures that rely on co-occurrence statistics of A and B in documents of large document corpora. Several such methods have been developed for the Web, which is the largest existing document corpus, whose documents consist of HTML pages and linked documents in PDF and other formats. One fundamental such measure is the Normalized Google Distance (NGD) is based on the page counts resulting from the following three Google searches: A, B, and A AND B. Another one occurrence-based similarity measure is the Pointwise Mutual Information (PMI) measure of which various improvements have been developed. The PMI method and its variants were defined in a more general context, but they can also be used with search-engine page-counts. PMI and three other page-count based similarity measures, (Jaccard, Overlap, and Dice), have been discussed and extended. These methods are useful for determining the relatedness of companies, and thus, in turn, for validating competitor-candidate pairs (A,B) previously computed by some knowledge-based method. However, these methods do not exploit already known competitors (if present) of A and B. For example, in Owler's Competitive Graph, many companies are associated with a list of manually validated competitors. These already known competitors constitute valid information that should be exploited in the search-based similarity computation, as they can help focusing the search towards more relevant documents. A new validation method, that takes already existing competitors of A and B into account is disclosed in the "Competitor Validation" section.

It can be observed that, despite the significance of computing company competitor pairs in today's global competitive environment, previous works regarding this problem have not achieved a practical solution that is precise enough and is widely applicable to different application scenarios. Conventional solutions leverage either one or the other of the two following features, without combining them: (i) knowledge about companies, and (ii) joint occurrences of companies in documents of a document repository. They are limited by the shortcomings of each of these features, while being agnostic of the power of their combination. Thus, there is a need in the art for systems that combine these two tools to achieve better results. In particular, systems were lacking that use knowledge-based inference to generate candidate competitor pairs and use joint occurrences of companies in documents to validate the candidate competitor pairs. Methods of generating competitors by entity set expansion can give good results at a higher precision than methods based on the count of result-pages of keyword-search, and can also generate new competitor candidates not already known as companies to a CIS. However, such entity-set based methods have to deeply analyze documents, which is computationally expensive and time consuming. In many practical contexts, faster methods are needed, that can exploit the keyword-index mechanisms of existing document stores rather than having to inspect and analyze documents on their own. It is with these issues in mind, among others, that various aspects of the disclosure were conceived.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

In one example, a method may include determining pairs of competing companies including accessing, by at least one processor, a company information system (CIS) and retrieving data from the CIS, the CIS storing data regarding companies comprising business entities, institutions, and organisations in non-transitory memory, determining, by the at least one processor, candidate competitor pairs of companies from already established competitor pairs stored in, and retrieved from, the CIS, and from other data stored in, and retrieved from, the CIS, and determining for each candidate competitor pair (company A, company C) one or more semi-final plausibility scores according to one or more criteria, each semi-final plausibility score for (company A, company C) expressing a degree of plausibility that company C is a competitor of company A, validating, by the at least one processor, candidate competitor pairs by accessing a searchable document store and performing searches to obtain for each candidate competitor pair statistics based on frequencies of co-occurrences in documents of the document store of names of two companies in the competitor pair, the frequencies determined from numbers or from sets of identifiers of result documents for search queries issued to the document store, and determining a co-occurrence-based competition likelihood score (CLS) expressing a degree of relatedness of the companies relative to the co-occurrences in documents of the document store, and aggregating, by the at least one processor, for each candidate competitor pair the one or more semi-final plausibility scores with the CLS to obtain a final plausibility score and selecting candidate competitor pairs as effective competitor pairs, having a final plausibility score that is in a predefined range of final plausibility scores.

In another example, a system to determine pairs of competing companies may include at least one processor to access a company information system (CIS) and retrieve data from the CIS, the CIS storing data regarding companies comprising business entities, institutions, and organisations in non-transitory memory, determine candidate competitor pairs of companies from already established competitor pairs stored in, and retrieved from, the CIS, and from other data stored in, and retrieved from, the CIS, and determining for each candidate competitor pair (company A, company C) one or more semi-final plausibility scores according to one or more criteria, each semi-final plausibility score for (company A, company C) expressing a degree of plausibility that company C is a competitor of company A, validate candidate competitor pairs by accessing a searchable document store and performing searches to obtain for each candidate competitor pair statistics based on frequencies of co-occurrences in documents of the document store of names of two companies in the competitor pair, the frequencies determined from numbers or from sets of identifiers of result documents for search queries issued to the document store, and determine a co-occurrence-based competition likelihood score (CLS) expressing a degree of relatedness of the companies relative to the co-occurrences in documents of the document store, and aggregate for each candidate competitor pair the one or more semi-final plausibility scores with the CLS to obtain a final plausibility score and select candidate competitor pairs as effective competitor pairs, having a final plausibility score that is in a predefined range of final plausibility scores.

In another example, a non-transitory computer-readable storage medium may have instructions stored thereon that, when executed by at least one computing device cause the at least one computing device to perform operations, the operations including accessing a company information system (CIS) and retrieving data from the CIS, the CIS storing data regarding companies comprising business entities, institutions, and organisations in the non-transitory computer-readable storage medium, determining candidate competitor pairs of companies from already established competitor pairs stored in, and retrieved from, the CIS, and from other data stored in, and retrieved from, the CIS, and determining for each candidate competitor pair (company A, company C) one or more semi-final plausibility scores according to one or more criteria, each semi-final plausibility score for (company A, company C) expressing a degree of plausibility that company C is a competitor of company A, validating candidate competitor pairs by accessing a searchable document store and performing searches to obtain for each candidate competitor pair statistics based on frequencies of co-occurrences in documents of the document store of names of two companies in the competitor pair, the frequencies determined from numbers or from sets of identifiers of result documents for search queries issued to the document store, and determining a co-occurrence-based competition likelihood score (CLS) expressing a degree of relatedness of the companies relative to the co-occurrences in documents of the document store, and aggregating for each candidate competitor pair the one or more semi-final plausibility scores with the CLS to obtain a final plausibility score and select candidate competitor pairs as effective competitor pairs, having a final plausibility score that is in a predefined range of final plausibility scores.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 4 illustrates an example of data relations contained in the CIS of a system according to an example of the instant disclosure.

FIGS. 6A-6D illustrates an example of creating competitor candidates via transitive closure according to an example of the instant disclosure.

FIG. 7 illustrates an example of queries used in the competitor validation step according to an example of the instant disclosure.

DETAILED DESCRIPTION

Figure 1:
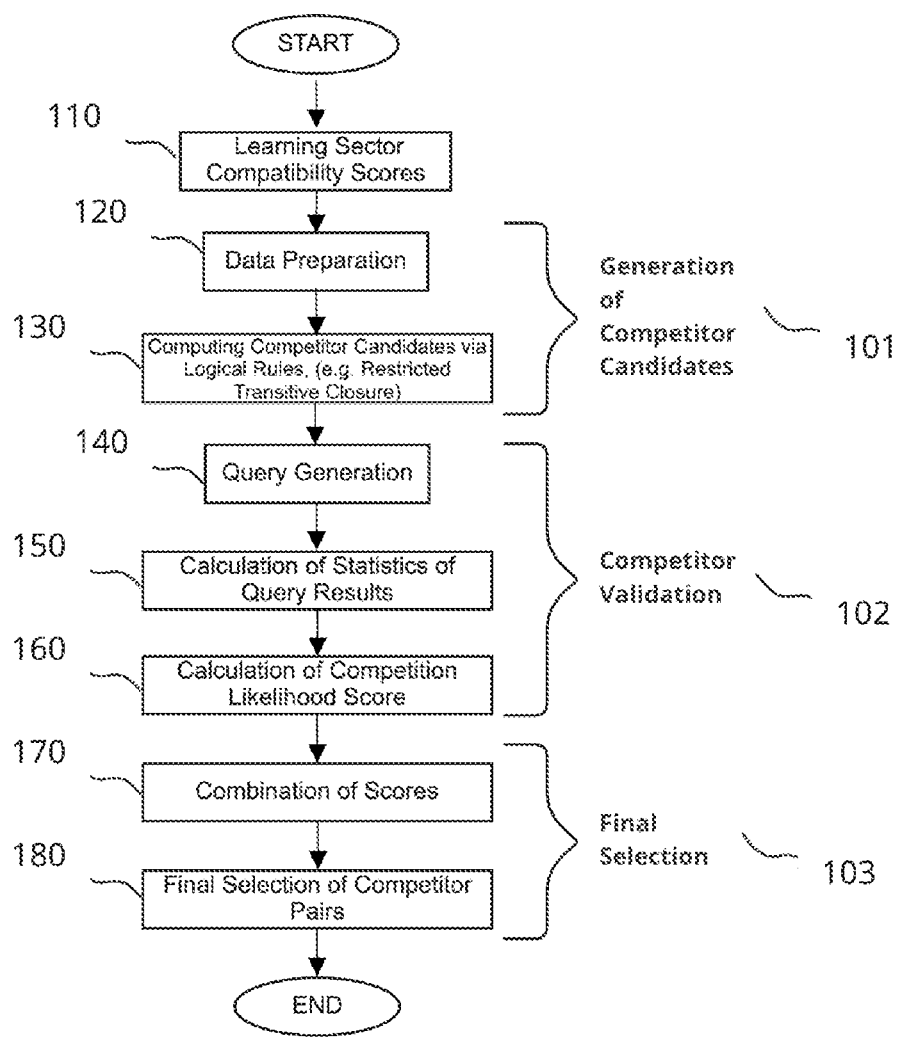
FIG. 1 is a flowchart of exemplary processing for computing company competitor pairs according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Ranges are used herein shorthand so as to avoid having to list and describe each and every value within the range. Any appropriate value within the range can be selected, where appropriate, as the upper value, lower value, or the terminus of the range.

Unless indicated to the contrary, numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

"Typically" or "optionally" means that the subsequently described event or circumstance may or may not occur, and that the description includes instances where said event or circumstance occurs and instances where it does not.

Wherever the phrase "for example," "such as," "including," and the like are used herein, the phrase "and without limitation" is understood to follow unless explicitly stated otherwise.

Generally, embodiments of the present disclosure are directed towards thermally conductive materials, including, as non-limiting examples,
Main Components Competitor data constitutes information useful to many business applications. Assume, for example, that a company A has a profitable corporate customer B. As usual, the sales department of A, may be constantly looking for new sales leads. For this purpose, it would be useful to know B's competitors, as they may need the same products or services that A provides to B. A company may also be interested in its own competitors, and may want to be alerted, when a new competitor enters the market. As another example, the purchase department of a company A buys regularly certain goods or services from a supplier B and may want to know whether B has a competitor C that provides the same goods and services (or appropriate alternatives) at a better price. Because of such and other applications, competitor data have become a valuable good that is marketed by various commercial data providers. Most of these data providers maintain a manually curated database or knowledge graph containing competitor pairs on non-transitory memory as part of a Company Information System (CIS) that also maintains on non-transitory memory other useful information about companies such as their branch offices' locations, the industry sectors in which they operate, their Headquarters' locations, and so on. Given the very large number of companies (over 10 million only in the US), larger CIS with competitor information are suitably crowd-sourced. A prime example is the already mentioned Owler CIS which is crowd-sourced from over a million experts.

A problem with crowd-sourced competitor relations is that they are rather incomplete. For example, one expert may enter that company B is a competitor of company A, and another expert enters that company C is a competitor of B. However, there is no higher level instance or "super-ordinate intelligence" that notices that from these two competitor pairs it may follow by (a kind of) transitivity that then C is then also a competitor of A. Actually, this does not hold in general. For example, A may compete with B over a product and B may compete with C over a different product, while A and C may not compete at all. On the other hand, sometimes A and C are, according to the CIS, in different industrial sectors but, in spite of this, are competitors as these sectors are overlapping and thus "compatible". Therefore, inferring correct new competitor pairs from existing ones, while very desirable, is not a trivial undertaking. The methods here disclosed come to the rescue.

Illustrative embodiments of the present disclosure provide methods for computing by use of one or more processors new company competitor pairs from a given CIS, stored on non-transient memory, that already contains some competitor pairs. As an example, the CIS is the Owler knowledge graph whose initial competitor pairs are mostly crowd-sourced, and each competitor pair (A,C) has a plausibility score PScore(A,B) assigned by an expert. In various embodiments, a process such as the one depicted in FIG. 1, is used for computing new competitor pairs (with their scores) from existing ones and from additional data.

First, sector compatibility scores are learned (or statistically computed) from existing competitor data already present in the CIS 110. Pairs of industry sectors that are highly compatible will get a score close to 1, whereas incompatible sectors will get score 0. To determine the sector compatibility score for a pair (S1,S2) of sectors, statistics are collected about the frequency of existing competitor company pairs (C1,C2) where C1 belongs to Sector S1 and C2 belongs to Sector S2. One exemplary way of doing this is described is described in detail in the "The Sector Compatibility Score" section.

Next, new candidate competitor pairs are generated 101. Where necessary, this starts with a data preparation phase 120 where all the relevant CIS data are made available in suitable form to the used inference engine. Explanations of this, for exemplary embodiments, are given in the "Uniform Access to Different Types of Knowledge" section.

A main step is the computation of candidate competitor pairs via logical rules 130. In exemplary embodiments, constrained (or, equivalently, restricted) forms of the transitive closure rule are applied to already existing competitor pairs (A,B) and (B,C) to generate a new pair (A,C) if certain conditions are fulfilled. These conditions can greatly vary in different embodiments. In an exemplary embodiment described in the "Creating Competitor Candidates via Constrained Transitive Closure" section these conditions require that A be different from C, and that the computed plausibility score PScore(A,C) for the pair (A,C) be larger than some cutoff constant, where PScore(A,C) is computed from the plausibility scores PScore(A,B) and PScore(B,C), from the sector compatibility score of the sectors of A and of B, and from a given penalty constant.

The next task 102, in exemplary embodiments, is to validate each generated candidate competitor pair (A, C) against a searchable document store (such as, the World Wide Web or a text database) in order to determine a degree of co-occurrence of A and C in documents of the document store. This degree is also referred to as the Competition Likelihood Score CLS(A,C) of A and C. This can be expressed, for example, as a value between 0 and 1, where a higher value indicates a higher frequency of co-occurrences. There are many ways to define CLS(A,C). In exemplary embodiments of the present disclosure (see the "Competitor Validation" section for details), CLS(A,C) is determined based on a comparison of a number of search results for two groups of queries to the document repository:

(i) a first group of queries for co-occurrences of names of A and of C together with names of some competitors of A (if any) or some competitors of C (if any), (ii) a second group of queries, corresponding to the first queries, where either A or C is replaced by random companies from the CIS not known to be in a competitor relationship with A or C, respectively.

These queries are generated in Step 140.

For each query, a predefined "denylist" (elsewhere also called blacklist) of document identifiers (URLs in case of using the Web as the document repository) is applied to eliminate competition-irrelevant documents from the returned documents. The number of competition-relevant documents (without duplicates) (a.k.a. "result page count") is then retained. This number is calculated based on inspecting the document identifiers of the documents in the returned query results, without loading, let alone analyzing, all the result pages 150. From the retained result page counts the likelihood score CLS(A,C) is calculated 160, whereby a higher CLS is achieved if the average number of search results by the first group of queries is higher than the average number of search results by the second group of queries.

In exemplary embodiments, the final part of the computation 103 includes the computation, for each candidate competitor pair (A,C), of a final score and the selection or rejection of the candidate pair. The scores PScore(A,C) and CLS(A,C) are combined to a single final score (170), and if (i) this single score is larger than a given constant, and (ii) the pair (A,C) is not already stored in the CIS with this final score or with a higher score, then (A,C) is selected (180) and inserted into the CIS as a new competitor pair together with its final score. Details are given in the "Combination of Scores and Final Selection of Competitor Pairs" section.

Figure 3A:
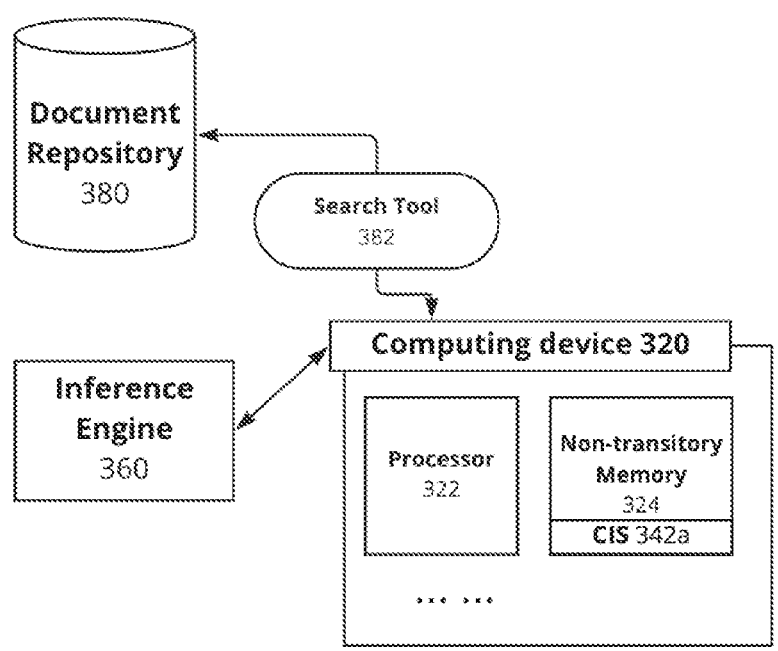
FIG. 3a, FIG. 3b, and FIG. 3c are all exemplary outline illustrations of systems according to an example of the instant disclosure.
Figure 3B:
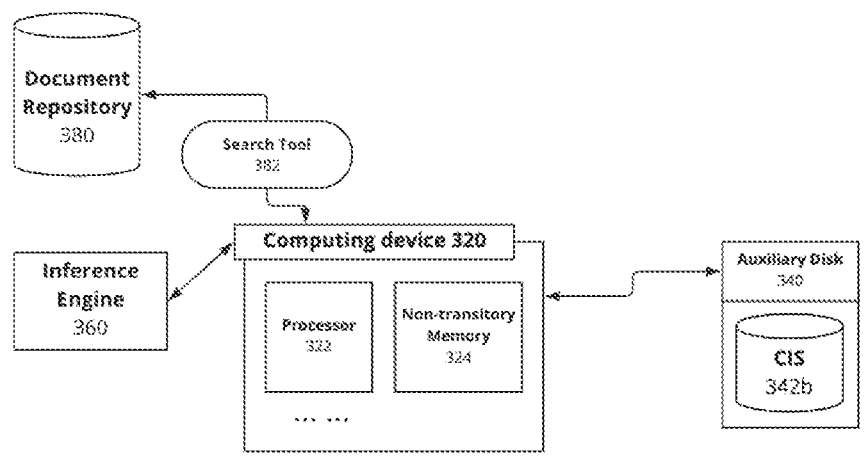
Figure 3C:
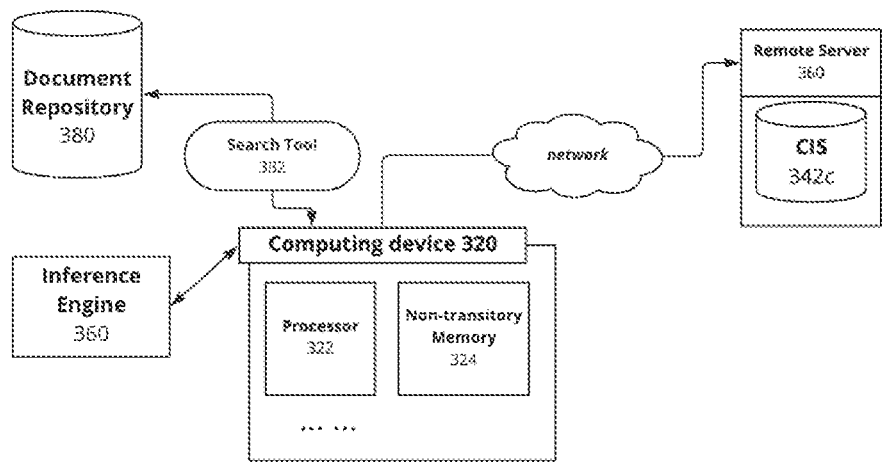

As shown in FIGS. 3*a*, 3*b*, and 3*c*, the system includes the following:

A computing device 320 comprising at least one processor 322, and a non-transitory memory 324, the computer being able to execute programs stored in the memory.

A CIS (342*a* or 342*b* or 342*c*) which can be queried and updated from the computer, and which is stored in the computer's memory 324 or on an auxiliary disk 340 or on some other storage device accessible to the computer, or on a remote server 360 accessible via a network. The CIS can be assumed to be the Owler Competitive Graph, which was actually used in a concrete implementation of a variant of this embodiment. The CIS associates to each company a company identifier (CID) uniquely identifying the company, a unique main company name, and a set of industry sectors here denoted by Sectors(CID) associated with each company. As another example, as described in the "Further Competition Criteria and Corresponding Scores" section, the system also may use a set of keywords that the CIS associates to each company. Keywords also may not be used.

For simplicity of illustration, the unique main company name can be used in this example, but in a different example, synonyms of this name will be available in the CIS and will be used for Web querying, as explained in more detail in the "Competitor Validation" section.

The CIS also contains a set of competitor pairs with associated proximity score s, directly available (or easily computable from the CIS) as a data relation Competitor(CID1, CID2,ProxScore), where a tuple <cid1,cid2,s> of this relation indicates that the company identified by cid1 has the company identified by cid2 as competitor with a proximity score s being a certainty degree about the competitive proximity of the two companies. It is here assumed that, as with Owler, these scores range from 0 (extremely unlikely to compete) to 100000 (sure competitors). Obviously, other ranges of degrees can be adopted in variants of this embodiment or also in significantly different embodiments, for example, normalized degrees in the interval [0,1] may be used. It is assumed, as is the case with Owler, that a large number of initial tuples of the Competitor relation were inserted manually by experts.

An inference engine 360 to execute (possibly recursive) rules of a logic programming language on the computing device. The language must be able to correctly handle basic aggregate functions (at least, max and min) and basic arithmetic operations in rule bodies. In a concrete implementation, a variant of the Vadalog language was used.

Uniform Access to Different Types of Knowledge

Figure 2:
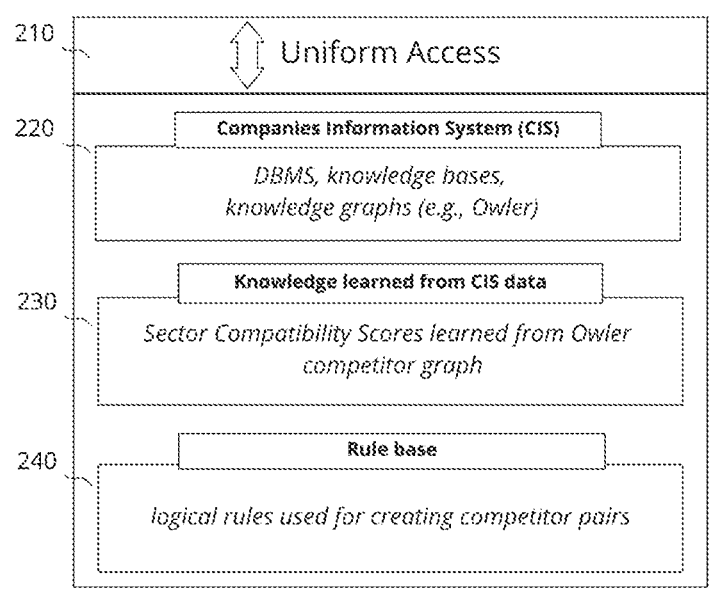
FIG. 2 is a diagram of an exemplary knowledge base used in a system according to an example of the instant disclosure.

As noted herein in the present disclosure, all the relevant types of knowledge, including the factual knowledge about companies stored in the CIS, the rule-based knowledge, and the knowledge about compatible company sectors, can be represented and accessed as logical facts or rules. For example, if R is an r-ary data relation relevant to the competitor computation process, then each of its tuples (or, equivalently, each of its rows) $<a_1, \ldots, a_k>$, can be represented as a logical fact $R(a_1, \ldots, a_k)$ and is accessible as such to the used logical inference engine. Advanced inference engines such as Vadalog (see also the "Rules and Inference" section) automatically identify database tuples with logical facts, and thus, no extra software interface is necessary. For inference engines where this is not the case, an explicit inter-translation is provided via a software interface. Therefore, the factual and rule-based knowledge is uniformly accessible 210, as illustrated by FIG. 2. This comprises (i) the original information about companies stored in the CIS 220 in form of databases, knowledge bases, or knowledge graphs, and, (ii) learned sector compatibility scores 230 (if available) possibly together with other generated data, and (iii) logical inference rules supplied by the application designer or programmer 240. Inference engines such as Vadalog, that directly access databases, automatically interpret database tuples as logical facts, and execute rules over such facts to generate new facts provide uniform access 210 by themselves, whereas with other inference engines, uniform access 210 is provided via a software interface.

Where a logic programming system is used as inference engine, the relevant knowledge is accessible in form of facts according to the syntax of the system's logic programming language, and the inference rules are stated in the same language. Knowledge and rules can be thus be uniformly accessed by the inference engine. Some details regarding logical facts and rules were already given in the "Rules and Inference" section.

The Sector Compatibility Score

Conventionally, when generating new competitor company pairs, two candidate competitors are to operate in similar industry sectors. The requirement that competing companies must operate in at least one common sector is too stringent for two reasons: (i) the sectors do not partition the set of all companies but may have large overlaps, and (ii) CIS like Owler are usually incomplete, and often for a company C, not all relevant sectors of C are recorded with C in the CIS, i.e. not all are available in Sectors(C). For this reason, it is useful to define a degree of compatibility among sectors, here referred to as "compatibility score". The rest of the present section describes how the compatibility score of two sectors is computed by the system. This computation essentially uses statistics over competitor data existing in the CIS. In other terms, the compatibility score is "learned" from CIS data.

The compatibility score is a value between 0 and 1, and it expresses the likelihood that two sectors contain competitors. Consider some sectors S and S' within the CIS. The idea is to compute the compatibility score based on statistics involving the relative number of edges from S to S' as detailed below.

The competitor graph is the directed graph whose vertices are company ids (CIDs) and where there is an edge <C/D1, C/D2> for each tuple <C/D1,C/D2,s> of the Competitor relation defined in the "Main Components" section, where s>0.8 (This constant may be different in variants of the embodiment).

Figure 5:
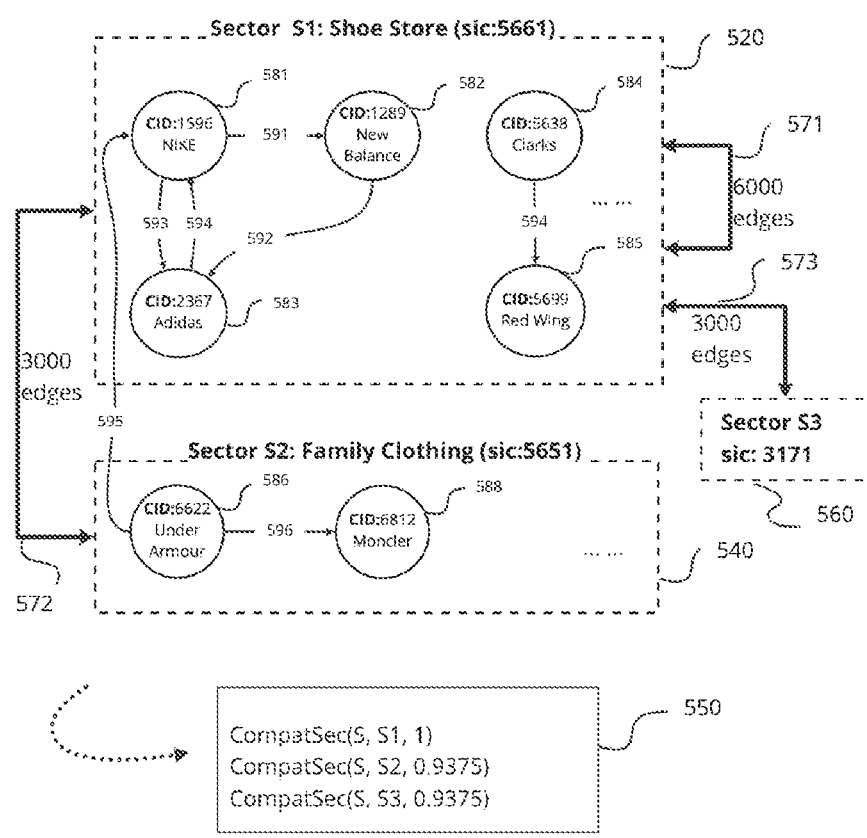
FIG. 5 illustrates an example of the process of learning sector compatibility scores from a competitor graph in the CIS according to an example of the instant disclosure.
Figure 6A:
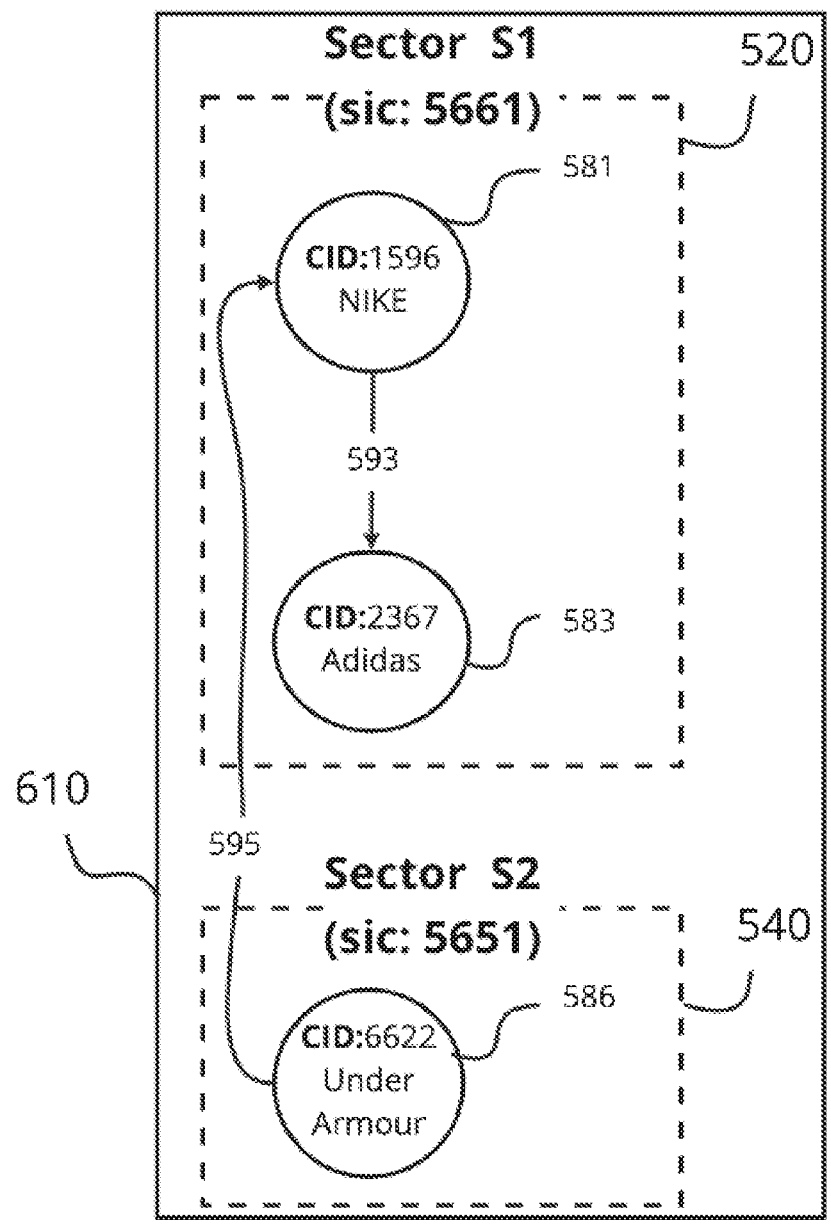
Figure 6D:
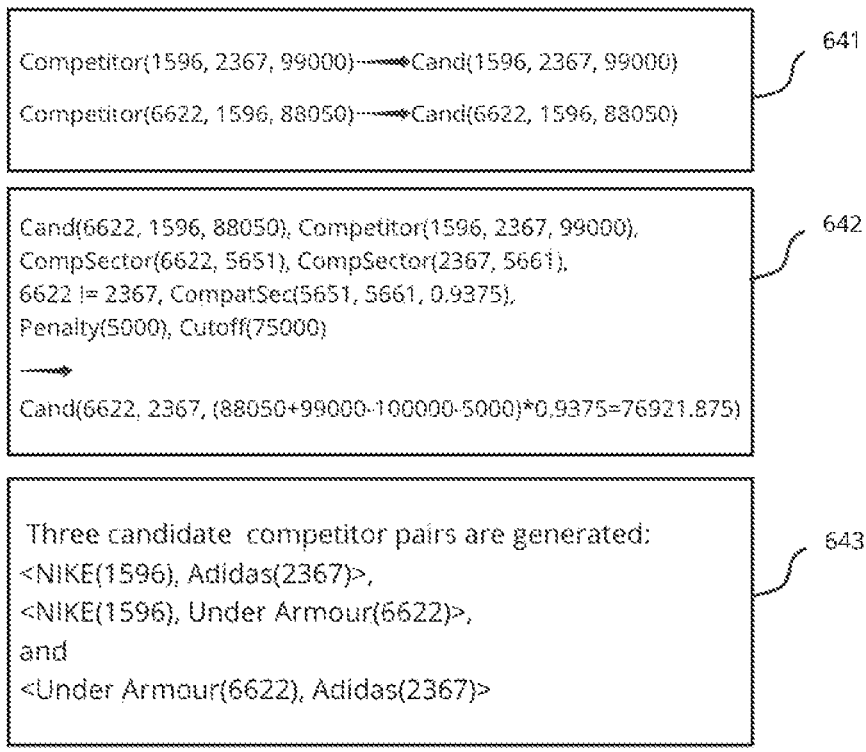

FIG. 5 illustrates a partial example of a competitor graph. In the sector $S_1$ (Shoe Store) 520, NIKE 581 and Adidas 583 are competitors of each other, and this symmetric relationship is depicted as two edges, an edge (edge 593) from NIKE 581 to Adidas 583, and an edge (edge 594) from Adidas 583 to NIKE 581; NIKE 581 is also connected with its another competitor New Balance 582 by an edge (edge 591); New Balance 582 has a competitor Adidas 583 and is connected with Adidas 583 by an edge (edge 592); Clarks 584, a company selling boots has a competitor, Red Wing 585 which is a popular brand of boots, and thus there is an edge (edge 594) from Clarks 584 to Red Wing 585. In $S_2$: Family Clothing 540, there is an edge (edge 596) from Under Armour 586 to its competitor Moncler 588. Also, Under Armour 586 and NIKE 581, although belonging to different sectors, are connected by an edge (edge 595) from Under Armour 586 to NIKE 581, since Under Armour 586 has NIKE 581 as its main competitor in the market of basketball shoes and clothes.

Note that the competitor graph is not necessarily symmetric. This may have two reasons. First, the Competitor-tuples that would give rise to some missing reverse edges may not yet have been asserted, and may be asserted at a later moment, for example through the application of a restricted symmetry rule, such as, for example Competitor(CID2,CID1,Score):—
  Competitor(CID1,CID2,Score),
  comparablesize(CID1,CID2), where comparablesize is a function that uses company data such as the revenue and/or the number of employees to determine whether two companies are of comparable size (for example, each is at most 30 times larger than the other). Second, it may be veracious that an edge has no reverse edge because in real life competition is not always symmetric. For example, a large supermarket may be (perceived as) a competitor for a much smaller one-person grocery, but not vice-versa.

The sector compatibility score is then determined as follows:

Let S be a sector and $S_1, \ldots, S_n$ be all sectors such that $<S, S_i>$, for $1 \le i \le n$ is an edge of the competitor graph. Normally, $S \in \{S_1, \ldots, S_n\}$, because in Owler and other real-life CIS, each sector will contain at least one company competing with a company of the same sector.

For every such $S_i$, $N_i$ is defined to be the number of edges from S to $S_i$, i.e. the number of competitor-pairs from sectors S and $S_i$.

Let $$N = \max_{1 \le i \le n}(N_i).$$

Let c=0.2 be some cutoff-constant (that could, of course, be chosen differently in a variant of this embodiment). If $$\frac{N_i}{N} < c$$

this then means that $S_i$ and $S$ should not be considered to be compatible.

The compatibility weight $f(S, S_i)$ for the sector pair $(S, S_i)$ is computed via the function $f: [0, 1] \times \mathbb{R}^+ \to [0, 1]$, where $$f(S, S_i) = \begin{cases} 0 & \frac{N_i}{N} < c \\ 1 - \left(1 - \frac{N_i}{N}\right)^4 & \frac{N_i}{N} \geq c \end{cases}$$

The compatibility score $f^*(S, S_i)$ is defined to be the maximum of the compatibility weights $f(S, S_i)$ and $f(S_i, S)$.

The above function $f$ was empirically determined and is a good fit. Intuitively, if $$\frac{N_i}{N} \geq c,$$

and if N is assumed to be very large (which it usually is in practice), then the formula $$1 - \left(1 - \frac{N_i}{N}\right)^4$$

takes into account that a sector S may have multiple other sectors that are highly compatible with S (which, again, often occurs in practice). For example, imagine that n=3 and that there are thus three sectors, say, $S_1=S$, $S_2$ and $S_3$. Moreover, assume that $N1=N=\max_{1 \leq i \leq n}(N_i)$, and that $N_2=N_3=N/2$, and that the competitor-relationships in this specific example are all symmetric. This is illustrated in FIG. 5, where there are 6000 edges 571 connecting $S_1$ 520 with itself, 3000 edges 572 connecting $S_1$ 520 with $S_2$ 540, and 3000 edges 573 connecting $S_1$ 520 and $S_3$ 560. Then, as displayed in 550 of FIG. 5, $f^*(S,S1)=1$ and $f^*(S, S_i)=0.9375$ for $2 \leq i \leq 3$, which is reasonable. In fact, given that N is very large also N/2 is a large number, which means that there is a large number of competitor pairs between sector S companies and sector $S_i$ companies, for $2 \leq i \leq 3$ which, in turn means that it is highly likely that S and $S_i$ are compatible industry codes for $2 \leq i \leq 3$. If instead one had used, say, $$1 - \left(1 - \frac{N_i}{N}\right)$$

instead of $$1 - \left(1 - \frac{N_i}{N}\right)^4,$$

then the $f$-values would be: $f^*(S, S1)=1$ and $f^*(S, S_i)=0.5$ for $2 \leq i \leq 3$, which is a much lower compatibility score than what is to be expected in practice. As another example, geared towards a very high precision (at the cost of a lower recall), $$1 - \left(1 - \frac{N_i}{N}\right)^3$$

was used instead of $$1 - \left(1 - \frac{N_i}{N}\right)^4$$

in the above formula defining the compatibility weight. This led to smaller clear in the next sections).

Regarding the definition of the compatibility score, there is, of course, room for variations and alternatives, and in other embodiments, other suitable definitions of $f^*$ may be used.

To make sector compatibility score accessible to Vadalog logic programs, for each pair of (not necessarily distinct) sectors $S_i$, $S_j$, logical facts $CompatSec(S_i,S_j,f^*(S_i,S_j))$ are inserted into the data space (a.k.a. fact base) accessible to the logic program to be specified further below. This can be done in form of single logical atoms, or in form of a data relation CompatSec which is made accessible to the Vadalog inference engine by appropriate binding declarations. FIG. 4 illustrates an example of the CompatSec data relation 460.

Generation of Competitor Candidates

Given a CIS as above with the information of competing companies, new competitors are inferred by first computing a set of competitor candidates using a constrained transitive closure on the knowledge graph, which derives a first competition score for each candidate pair;

then, using a validation method based on web-search derives a second confidence score for each candidate pair, based on the frequency of co-occurrence in Web pages;

finally, combining for each pair these two scores to a unique proximity score, and if this is greater than a threshold admitting and storing the pair (with the associated final proximity score) as a new competitor.

The constrained transitive closure, for each generated pair competitors, also derives a proximity score that expresses a plausibility degree of competitiveness between companies.

Data Preparation

The relevant company data from the CIS is mapped by appropriate queries to the following data relations:
CompSector(CompID,Sector),
Competitor(CompID1,CompID2,ProxScore),
CompName(CompID,CompName).

The CompSector relation, contains a tuple <cid, sec> if and only if cid is a company ID from the CIS and sec∈Sectors(cid).

The Competitor relation is the one defined in the "Main Components" section, and the CompName relation contains a tuple <cid,name> if and only if name is the unique main company name associated to the company identified by cid in the CIS.

These data relations are made accessible to a Vadalog program whose rules are given in the following "Creating Competitor Candidates via Constrained Transitive Closure" section.

The relations 420, 480, and 440 in FIG. 4 are examples of data relations CompSector, Competitor, and CompName, respectively. From these relations, the CompstSec relation 460 is generated as described in the "The Sector Compatibility Score" section.

Creating Competitor Candidates via Constrained Transitive Closure

This section describes the creation of candidate pairs of competitors, which are also referred-to as "competitor candidates" in the following, together with their proximity scores, via a constrained transitive closure.

The computed competitor candidate pairs are collected into a new relation Cand(CID1,CID2, PScore) where PScore denotes the proximity score between the companies identified by CID1 and CID2, which is computed for new candidate pairs. The proximity score is an integer in the interval [0,100000]. The more plausible it is that companies CID1, CID2 are competitors, the higher is their proximity score. The proximity score increases if two companies are more likely to be competitors.

The computation uses two parameters whose values can be chosen in a particular setting:

A (usually relatively small) penalty constant $\alpha$, with $0 < \alpha < 100000$, which slightly lowers the proximity scores of new candidate pairs generated by transitivity, so that candidate pairs that are generated by increasing derivation chains are assigned a decreasing proximity score that, in a sense, account for a higher uncertainty of the pair. This constant is asserted as a fact Penalty ($\alpha$). A practical value for a would be, for example, 5,000, in which case Penalty(5000) would be asserted.

A cutoff constant $\beta$ with $0 \leq \beta < 100000$, which is used to ensure that new competitor candidates must have a proximity score greater than $\beta$. This constant is asserted as a fact Cutoff($\beta$). A practical value for $\beta$ would be, for example, 75,000, in which case Cutoff(75000) would be asserted. In an example, that was geared towards very high precision (at the cost of a lower recall), a cutoff value of 90000 was used.

By assigning values to the constants $\alpha$ and $\beta$ one can steer the trade-off between precision and recall. Raising any of these values increases precision and reduces recall.

The relation Cand is computed by the following Vadalog rules:

Cand(CID1,CID2,PScore):—
  Competitor(CID1,CID2,PScore).
Cand(CID1,CID3,PScore):—
  Cand(CID1,CID2,PS12),
  Competitor(CID2,CID3,PS23),
  CompSector(CID1,SEC1),
  CompSector(CID3,SEC3),
  CID1!=CID3,
  CompatSec(SEC1,SEC3,SeCoScore),
  Penalty(A), Cutoff(B),
  PScore=max((PS12+PS23−100000−A)*SeCoScore),
  PScore>B.

The above Vadalog program computes a fact (or tuple) Cand(CID1,CID3,PScore), either if such a fact is already in the Competitor relation, or if there is an already computed fact Cand(CID1,CID2,PS12) and a fact Competitor(CID2, CID3,PS23), where the following conditions are satisfied:

The companies identified by CID1 and CID3 have sectors SEC1 and SEC3, respectively. (Note: They could have further sectors, too), and SeCoScore is the compatibility is score $f^*(SEC1,SEC2)$ of these sectors.

For each pair of company IDs CID1 and CID3 as above, a unique proximity score PScore for CID1 and CID3 is computed, which is the maximum value of (PS12+PS23−100000−$\alpha$)×$f^*$(SEC1,SEC3) over all matching choices of CID2, SEC1, and SEC3. (To understand the semantics of aggregate functions such as max in Vadalog, see Section 3.3 of the Vadalog Handbook.)

The PScore as computed above for company IDs CID1 and CID3 must be greater than the cutoff constant $\beta$.

Note: The subexpression PS12+PS23−100000 in the formula for computing proximity score for CID1 and CID3, when normalized to the interval [0, 1] instead of [0, 100000] essentially corresponds to the treatment of strong conjunction (a.k.a. Łukasiewicz T-norm) in the infinite-valued Łukasiewicz Logic, which is also corresponds to a particular fuzzy logic. This subexpression always yields a smaller score than the formula min(PS12+PS23) which corresponds (modulo normalization) to the weak conjunction in infinite-valued Łukasiewicz Logic. This indicates that the method for computing scores for transitively computed pairs is a cautious one, that is geared towards a higher precision and thus possibly a lower recall. Moreover, the score is further diminished by the subtractive constant $\alpha$ and by the multiplication with $f^*(SEC1,SEC2) \leq 1$. In other embodiments, one may be interested in a higher recall (possibly at the cost of a lower precision) and may use min(PS12, PS23) instead of PS12+PS23−100000.

FIGS. 6a-6d illustrate an example of executing the Vadalog program for computing the Cand relation introduced further above in the present section. The example is based on a small competitor graph 610 in FIG. 6a, where NIKE 581 is connected with Adidas 583 and Under Armour 586 is connected to NIKE 581 by edges 593 and 595, respectively. (Note that only arcs relevant to the example are shown in this figure; further arcs may exist, such as the reverse arcs of 593 and 595.) The corresponding data relations are specified in FIG. 6b. After executing the Vadalog rules 621 and 622 in FIG. 6c, three candidate competitor pairs are generated, as listed in 643 of FIG. 6d. First, the execution of rule 621 turns existing competitor pairs in the competitor graph into candidate pairs, as illustrated in 641. Then, by executing the transitivity rule 622, a new candidate pair <Nike(6622), Adidas(2367)> is created, as illustrated in 642, where the max operator used in the rule 622 is omitted since each company is associated with only a single sector in this example.

Competitor Validation

In previous steps, pairs of compatible companies whose related industry sectors are compatible with each other have been generated. However, as already explained in the "Compatible Company Sectors" section, for two companies, being compatible with each other does not necessarily mean that they are competitors of each other. Therefore, each generated pair (A,B) of compatible companies is further validated to check whether A and B are likely to be competitors. This process is called "Competitor Validation" hereafter. The validation result, denoted by CLS(A,B) is a score called Competition Likelihood Score (CLS). CLS ranges from 0 to 1. The higher CLS(A,B), the more likely A and B are competitors. The Competitor Validation process can operate using a document repository. It utilizes the number of documents containing co-occurrences of companies as the key factor in the calculations of Competition Likelihood Scores.

In one example, the Web is used as the document repository. To explore Web pages in the Web, an API provided by a third-party service SerpAPI is used to submit search engine queries (shortly called as queries hereafter) to Google Search and get search results, i.e., URLs of Web pages matching the submitted queries. Of course, fixing a document repository and exhibiting a particular way of utilizing the statistics about co-occurrences of companies should in no way limit other embodiments of the disclosure. In other embodiments, other types of document repositories may be used, for example, a local document store.

The Competitor Validation method described in this embodiment is based on two observations, as described below.

Observation I Company A's competitors co-occur with A on competition-related Web pages more often than A's non-competitors. Here, the term "competition-related Web pages" means Web pages displaying contents related to company competitions.

Observation II A Web page containing occurrences of companies that are competitors of each other is usually a competition-related Web page.

Inspired by Observation I, the statistics about company co-occurrences on competition-related Web pages is used as a key feature to assess the CLS of two companies A and B. To calculate CLS(A, B), as will be made more precise below, the number of competition-related Web pages containing A and B is compared with the number of competition-related Web pages containing A and randomly-selected companies and the number of competition-related Web pages containing B and randomly-selected companies.

Observe that only competition-related Web pages count in the calculation of CLS(A,B). Therefore, a solid method of finding competition-related Web pages is necessary. An approximate method based on Observation II is used in this embodiment. Web pages containing co-occurrences of a company A and at least one of competitor A* of A are considered to be competition-related unless they were previously determined to be irrelevant. A pre-defined "denylist" (elsewhere also called blacklist) of website domains is applied to further eliminate competition-irrelevant Web pages. Such a denylist, generated by a human or an automatic program, contains the domains of websites that are likely to mention companies in competition-irrelevant content. Taking the website Pinterest as an example, Web pages of Pinterest often contain occurrences of different companies but their contents are usually not related to company competition. Pinterest Web pages mentioning companies usually contain different users' profiles on the same page, and companies are mentioned in the employer information of different users. Thus, the domain pinterest.com is added to the denylist. A Web page whose URL domain is on the denylist is excluded from further computation processes.

Based on the above ideas, a precise Competitor Validation procedure was designed and was used. Given as input a pair of company names A and B, the procedure performs three steps, which are described in the subsequent sections.

Step 1. Query Generation

At the first step, queries of two different types are generated according to the templates listed as follows:

Query Type I:
T1: "$A_1$*" OR ... OR "$A_m$*" "A" "B"
T1*: "$B_1$*" OR ... OR "$B_n$*" "A" "B"

Query Type II:
T2: "$A_1$*" OR ... OR "$A*$" "A" "R(A)"
T2*: "$B_1$*" OR ... OR "$B_n$*" "B" "R(B)"

In these query templates, each $A_i$*, for $1 \le i \le m$ denotes an already-known competitor of company A. Similarly, each $B_j$*, for $1 \le j \le n$ denotes an already-known competitor of company B. As described in the "Main Components" section, already-known competitors of A or B can be retrieved from the embodiment's CIS. R(A) (analogously, R(B)) denotes a company randomly selected from a pre-generated list of companies that are not known to be a competitor of A (respectively, B) at the time when the Competitor Validation is triggered. As described in the "Main Components" section, such lists can be easily generated based on the information stored in the system's CIS. Company names are used as search terms and are combined by different operators as explained below.

Observe that there may be no known competitor of A or B in the CIS at the time when queries are generated. When this happens, for example, when there is no known competitor of A, the part ""$A_1$*" OR ... OR "$A_m$*"" of T1 and T2 can not be instanced. The following variants of T1 and T2 are then adopted, as listed below:
T1 variant: "A" "B"
T2 variant: "A" "R(A)"

Similarly, when there is no known competitor of B, the following variants of query templates T1* and T2* are then adopted:
T1* variant: "A" "B"
T2* variant: "B" "R(B)"

In some examples, queries may apply the Google Search's query syntax. Note that according to how Google interprets queries, T1 is logically equivalent to the expression ("$A_1$*" OR ... OR "$A_m$*") AND "A" AND "B". However, due to peculiarities of the Google Search implementation, parenthesis-free and "AND"-free queries are preferable in certain cases (e.g., when commands, as explained below, are used, in which case, parentheses and/or "AND" occurrences may confuse the Google Search engine). Similar comments apply to the T1*, T2 and T2*. However, in another embodiment, some other search engine may be used, and thus the queries ought to apply that search engine's query syntax accordingly.

In Google Search queries, search terms are combined by logical AND operator by default, and the AND operator is usually omitted. OR is a basic operator enforcing that each Web page in the search results should satisfy at least one of the search criteria combined by OR. For example, a query with search terms combined by OR should match Web pages containing at least one of the search terms. Each company name is put in double quotes which forces Google to find exact (but case-insensitive) matches of the company name and prevents matching its synonyms (which are possibly generated by Google Search). In some other embodiments, such double quotes may be omitted.

In some other embodiments, queries may contain special commands, as illustrated by the templates below.
Query Type I:
T1-C: [cmd]: "$A_1$*" OR ... OR "$A_m$*" "A" "B"
T1-C*: [cmd]: "$B_1$*" OR ... OR "$B_n$*" "A" "B"
Query Type II:
T2-C: [cmd]: "$A_1$*" OR ... OR "$A_m$*" "A" "R(A)"
T2-C*: [cmd]: "$B_1$*" OR ... OR "$B_n$*" "B" "R(B)"

[cmd] in the query templates is a placeholder of a command cmd that further filters search results. In some embodiment, the command allintext is used to restrict search results to those Web pages containing all required search terms in the text. It prevents matching the search terms in irrelevant and sometimes hidden parts of a Web page, such as the search optimization keywords that the website builder generates. In other embodiments, other commands may be used, such as allintitle.

Queries according to query template T1, restrict the Web search results to Web pages containing co-occurrences of A and B and at least a known competitor of A. Analogously, queries according to query template T1* restrict the Web search results to Web pages containing co-occurrences of A and B and at least a known competitor of B.

Queries according to query template T2, restrict the Web search results to Web pages containing co-occurrences of A and a randomly selected company R (A) and at least a known competitor of A. Analogously, queries according to query template T2* restrict the Web search results to Web pages containing co-occurrences of B and a randomly selected company R(B) and at least a known competitor of B.

As an example, for each company whose name is to be used in a query (called "constituent company" hereafter), only its unique main name (usually its best-known name) is adopted as a search term in the query. The company-type indicator terms such as Inc., Co., Corp., Ltd., and so on, are removed from the company names. The unique main name of a company is available, as explained before, in the data relation CompName(CompID,CompName). Given a pair of companies A and B, the queries according to each of the templates T1 and T1* are determined. For each template, a single instance is generated. However, for each of templates T2 and T2*, multiple instances are generated by taking different randomly-selected companies. A pre-fixed system parameter k>1 determines that k different instances of T2 and k different instances of T2* ought to be generated. Therefore, 2+2×k queries are generated in total for each given pair of companies.

FIG. 7 illustrates example queries for validating the candidate competitor pair <NIKE, Under Armour>, where queries of Query Type I are displayed in 720 and queries of Query Type II, with k=3, are displayed in 740.

Observe that for some search engines, such as the Google Search, the order of search terms, even though combined by the same operator (e.g., AND), may still affect the search results. For example, a query of "elephant" AND "mouse" and a query of "mouse" AND "elephant" get different numbers of search results from the Google Search. However, experiments showed that such distortion to the search results caused by different orders of search terms turns out to be irrelevant to the overall Competitor Validation procedure. Therefore, given a query q and its variant q* derived by changing the orders of q's search terms combined by the same operator, q and q* are regarded as equivalent.

Step 2. Calculation of Statistics of Query Results

For a pair of companies A and B, all queries generated at Step 1 are submitted to SerpAPI to call the Google Search to search for Web pages matching the queries. When submitting each query, the SerpAPI parameter "num" that defines the maximum number of results to return is set to 100 (According to the documentation of SerpAPI on 25 Feb. 2022, 100 is the maximum number of search results that SerpAPI can return for a single query submission). For a query with more than 100 search results, to get all its search results, the same query should be submitted multiple times with num=100 and an extra SerpAPI parameter "start" appropriately set. The "start" parameter of SerpAPI determines the number of search results to be skipped for a submitted query. For example, assume that there are 300 Web pages matching a query q (The total number of search results of a query can be found in the "total_results" field of the SerpAPI output.). To get all these 300 Web pages via SerpAPI, q should be submitted three times with num=100 and an additional SerpAPI parameter start=0, start=100, and start=200, respectively. Observe that it is not always necessary to get all the Web pages matching a query, as explained further below. In some other embodiments, to reduce the cost of third-party search services such as SerpAPI, search results of every query q are cached until they expire after a fixed period. Unexpired search results of q are reused for future queries equivalent to q.

Among the search results of each query q, those Web pages whose domains are on the denylist are eliminated, and the remaining Web pages are stored in a set Res(q) of size |Res(q)|.

Let q1 and q1* denote query instances of T1 an T1*, respectively, and let $q2_i$ and $q2_i^*$, for $1 \leq i \leq k$, denote query instances of T2 and T2*, respectively. The formulas listed below are applied.

$$n_1 = (|Res(q1)| + |Res(q1^*)|)/2 \quad (1)$$

$$n_2 = \left(\sum_{i=1}^{k}(|Res(q2_i)| + |Res(q2_i^*)|)\right)/2k \quad (2)$$

$$r = \begin{cases} \text{Infinite} & \text{if } n_1 \neq 0 \text{ and } n_2 = 0; \\ 0 & \text{if } n_1 = 0 \text{ and } n_2 = 0; \\ n_1/n_2 & \text{otherwise.} \end{cases} \quad (3)$$

Formula (1) is used to calculate $n_1$, the average size of Res(q1) and Res(q1*). Similarly, Formula (2) is used to calculate $n_2$, the average size of $Res(q2_i)$ and $Res(q2_i^*)$ for $1 \leq i \leq k$. A ratio r reflecting the difference between $n_1$ and $n_2$ is calculated by Formula (3).

If r is equal to or smaller than 1, the pair (A, B) is considered as a non-competitor pair and the Competitor Validation result CLS(A,B) is set to 0. Otherwise, the larger the ratio r, the more likely A and B are competitors. Hereafter, the ratio r is called Competitor Ratio (CR). A CR calculated for A and B is denoted by CR(A,B).

Recall that for a query q with more than 100 search results, acquiring all Web pages matching q requires submitting q multiple times with the "start" parameter of SerpAPI set to proper values. However, there are two situations, where such a process does not need to be completed until the exhaustion of the search. To understand these situations, assume that at some stage, q1, q1*, $q2_i$ and $q2_i^*$ (for $1 \leq i \leq k$) are submitted with the same SerpAPI parameter setting, num=100 and start=N, where N is a proper value of "start" (typically 100, 200, . . . , etc.). The first situation occurs when both of q1 and q1* yield fewer than 100 Web pages while some query $q2_i$ (or $q2_i^*$) (for $1 \leq i \leq k$) yields 100 Web pages, and CR(A,B)≤1. In this situation, CLS(A,B) is determined to be 0. According to formulas 1-3, discovering more Web pages matching $q2_i$ (or $q2_i^*$) only makes CR(A,B) even smaller and does not affect the value of CLS(A,B). Thus, there is no need to submit $q2_i$ (or $q2_i^*$) with "start" set to a value greater than N to retrieve further Web pages. The second situation occurs when q1 (or q1*) yields 100 Web pages while all queries $q2_i$ and $q2_i^*$ for $1 \leq i \leq k$ yield fewer than 100 Web pages, and CR(A,B)>65. In this situation, CLS(A,B) is determined to be 1 (as will be explained in the next section). According to formulas 1-3, discovering more Web pages matching q1 (or q1*) only makes CR(A,B) even larger and does not affect the value of CLS(A,B). Thus, there is no need to submit q1 (or q1*) with "start" set to a value greater than N to retrieve further Web pages.

Step 3. Calculation of CLS when CR(A,B)>1

Whenever CR(A,B)>1, CR(A,B) is converted to a Competitor Likelihood Score CLS(A,B) which ranges from 0 to 1. To do that, a CR-to-CLS lookup table mapping a CR interval to a CLS is used. Table 1 shows an example of the CR-to-CLS table. Each CR(A,B)>1 falls into one of the CR intervals in the "CR interval" column, and the corresponding CLS of the CR interval is returned as the CLS of CR(A,B). If $CID_A$ and $CID_B$ are the company IDs of A and B, then this score is denoted by $CLS(CID_A$ and $CID_B)$. In the CR-to-CLS table, CR intervals are manually crafted while their corresponding CLSs are generated via an automatic process.

TABLE 1

An example of CR-to-CLS lookup table

| CR interval | CLS |
|---|---|
| (1, 2] | 0.79 |
| (2, 3] | 0.85 |
| (3, 4] | 0.87 |
| ... | ... |
| (50, 55] | 0.91 |
| (55, 60] | 0.95 |
| (60, 65] | 0.98 |
| (65, Infinite] | 1.0 |

Before generating a CR-to-CLS table, a list of CR intervals is generated. For example, such a list of CR intervals can be the same as the "CR interval" column of Table 1. All CR intervals are right-closed. Starting from the interval (1,2], each interval with a right bound smaller than or equal to 50, such as (2,3], has a size of 1. Each interval with a left bound larger than or equal to 50 and a right bound smaller than or equal to 65, such as (50,55] has a size of 5. The rationale behind such a design is to account for the relative difference of CRs: for a large CR value, such as a CR value greater than 50, an increase by 1 (i.e., by 2%) should have a small effect on its CLS, while for a small CR, say 2, an increase by 1 represents an increase of 50% and should thus have a more significant effect on the associated CLS. Finally, a wide-range interval (65, Infinite] is used to represent all CR values larger than 65, including the infinite value Infinite. In some other embodiments, the above intuition of adjusting the effect of CR-value changes may be expressed more formally, for example, by using a function $r(l)=2^{log_2(l)+0.5}$, where l is the left bound of an interval, and r(l) is the corresponding right bound of the interval.

Algorithm 1: GENLOOKUPTABLE($\mathcal{P}$,, $\mathcal{N}$,, $\mathcal{I}$): Generate a lookup table mapping CR intervals to CLSs.
input: $\mathcal{P}$ —a list of competitor pairs.
  $\mathcal{N}$ —a list of company pairs which are not known to be competitor pairs.
input: $\mathcal{I}$ —a list of pre-defined intervals.
output: A lookup table of which the key is an interval in J, and the value is the CLS of CR values falling into that interval.
posCount←{ };
negCount←{ };
foreach pos∈$\mathcal{P}$ do
  r←CalculateCR(pos);
  foreach(a, b)∈$\mathcal{I}$ do
    if a<r≤b then
      posCount[(a, b)]+=1;
      break;
    end
  end
end
foreach neg∈$\mathcal{N}$ do
  r←CalculateCR(neg);
  foreach(a, b)∈$\mathcal{I}$ do
    if a<r≤b do
      negCount[(a, b)]+=1;
      break;
    end
  end
end
T←{ };
foreach (a, b)∈$\mathcal{I}$ do
  T[(a, b)]←posCount[(a, b)]/(posCount[(a, b)]+negCount[(a, b)]);
end
return T;

As an example, the CR-to-CLS lookup table is generated by an empirical method, adopting a process similar to the Monte Carlo simulation method. The pseudo-code of this process is described in Algorithm 1. The required inputs of Algorithm 1 are: (i) $\mathcal{P}$,, a list of known competitor-pairs; (ii) $\mathcal{N}$,, a list of company pairs that are not known to be competitor pairs, (iii) $\mathcal{I}$,, a list of CR intervals. Each competitor pair in $\mathcal{P}$ is randomly selected from known competitor-pairs stored in the CIS. Each company pair $(c_i, c_j)$ in $\mathcal{N}$ is generated by random selections. First, a company $c_i$ is randomly selected from the whole set of all companies in the CIS, then a company $c_j$ is randomly selected from those companies which are not known to be competitors of $c_i$. Observe that company pairs in $\mathcal{N}$ are more likely to be non-competitors considering the sparsity of competitor pairs in the CIS. Competitor pairs in $\mathcal{P}$ are called positive pairs and company pairs in $\mathcal{N}$ are called negative pairs hereafter. The number of positive pairs is equal to the number of negative pairs, and this number is determined by a pre-fixed parameter N. A larger N usually leads to a better result of Algorithm 1, and ideally, N's value should be set as the total number of known competitor pairs in the CIS. However, a larger N also causes more expensive computational cost. Thus, setting N's value requires a proper compromise between the computational cost and the result, and should be decided according to the actual implementation.

In the beginning, two dictionaries posCount and negCount are initialized. Each key in posCount is an interval taken from $\mathcal{I}$,, and its corresponding value is a counter (called positive counter) that keeps track of how many positive pairs have CR values falling within this interval. Similarly, each key in negNum is also an interval, but its corresponding value is a counter (called negative counter) keeping track of how many negative pairs have CR values falling within the interval. For each positive pair, a CR r is calculated. Then an interval (a, b) with a<r≤b is found, and the corresponding counter of interval (a, b) in posCount is increased by 1. A similar process is adopted for calculating key-value pairs in negCount.

After calculating key-value pairs in posCount and negCount, the CLS of each CR interval is calculated by dividing the positive counter of the interval by the sum of the positive and negative counters of the interval. Each CR interval and its CLS is saved as a key-value pair in the dictionary T. Finally, Algorithm 1 returns T as the CR-to-CLS lookup table.

Combination of Scores and Final Selection of Competitor Pairs

For each fact Cand(CID1,CID2,PScore) generated by the Vadalog program of the "Creating Competitor Candidates via Constrained Transitive Closure" section for a pair of distinct companies (CID1,CID2), a final score is computed by combining the PScore value, which is referred to as PScore (CID1,CID2) with the score CLS(CID1, CID2) as computed according to the "Step 2. Calculation of Statistics of Query Results" section. Define: CLS*(CID1, CID2)) =CLS(CID1, CID2))×$10^5$.

There are many ways of combining different types of scores, some of which will be mentioned in the "Extensions, Refinements, Variations and Alternatives" section. In this embodiment a truly simple combination is used: The final proximity score is the arithmetic mean of the two scores: fs(CID1,CID2):=

$$\frac{PScore(CID1, CID2) + CLS^*(CID1, CID2)}{2}$$

Let k=90000 be a final cutoff constant.

If the there exists no score s≥fs(CID1,CID2) such that Competitor(CID1,CID2,s) is already known, (i.e., where a tuple (CID1,CID2,s) is in the Competitor relation), then add the new tuple (CID1,CID2,fs(CID1,CID2)) to the Competitor relation and eliminate all tuples (CID1,CID2,u) from Competitor, where u<fs(CID1,CID2)).

Extensions, Refinements, Variations and Alternatives

As discussed above, there are other ways to combine knowledge based competitor generation methods with validation methods based on the co-occurrence of company names in documents of a document repository.

Alternative Rule Languages

Instead of Vadalog, which is an extension of Datalog, in other embodiments, one may use plain Datalog or other variants of Datalog, or other logic programming languages with appropriate inference engines such as Prolog, or probabilistic logic programming languages or formalisms such as Problog or fuzzy versions of Datalog such as, for example, MV-Datalog or its extension MV-Datalog$^+$. Other embodiments may use Answer Set Programming and corresponding inference engines (solvers) (e.g., DLV, Clasp, SModels) or yet other languages together with appropriate inference engines.

In further embodiments, extensions of such languages may be used that feature interfaces to external software resources, such as API or other interfaces to DBMS, data warehouses, CRM, machine learning software, trained neural networks, classifiers, optimization packages, integer and linear programming software, NLP packages, standardized user interface and graphics packages for user interactions (e.g., for users to give examples or to give feedback), where such interfaces can be addressed and used via special predicates.

In yet other embodiments, logical rules are expressed as SQL queries or queries in some other appropriate query language, where a query processor acts as inference engine.

Note that standard SQL or other classical relational languages lack the expressive power of Datalog or related fully recursive languages such as Vadalog. Consider a Datalog program P and the set of SQL queries Tr(P) obtained by translating each Datalog rule into a corresponding SQL query. Then, while a Datalog inference engine would execute the rules of P over some database D over and over, until a fixed point is reached and no further fact can be derived, an SQL query processor would execute each query in Tr(P) only once, even though the newly generated tuples could trigger further query results. A simple solution to obtain a Datalog-like fixed point semantics via SQL is to embed the SQL statement into a loop programmed in some host programming language. Roughly, such a loop could look as follows: REPEAT Execute via SQL all queries in Tr(P) UNTIL no new tuple is added to D.

Further Competition Criteria and Corresponding Scores

As described herein the four main criteria for companies A and C to be competitors were (i) there is a company B such that (A, B) and (B, C) are already known to be competitor pairs, (ii) A and C are in compatible sectors, (iii) the names of A and C jointly appear on a significant number of web pages, and (iv) the overall score computed from criteria (i)-(iii) is not below a certain threshold.

In different embodiments some of these criteria may be missing or restricted, or there may be other criteria that either replace some of the above criteria or modify them, or are taken in addition. For example Criterion (i) could be modified by adding to the transitivity rule another rule for generating competitor candidates which says that if (A, B) is a known competitor pair and A and B are not of disproportionate size, then so is (B, A). The size of a company can be measured as a function of its number of employees and/or its revenue. For most covered companies, estimates of the number of employees and of the revenue are available in CIS such as Owler or Crunchbase.

A simple example for a restriction of Criterion (ii) would be to require A and B to be in a same sector rather than just in compatible sectors. This would lead to a more precise but less complete result.

Several useful additional criteria can be built around keywords available in a CIS. The keywords associated with a company describe its products or services. For example, in the Owler CIS, a list of keywords is associated with each company. In rare cases, this list may be empty. Denote the set of keywords associated to company X by Keywords(X). Then, a closeness score between company A and company C is given by the Jaccard similarity score $$J(A, C) = \frac{|Keywords(A) \cap Keywords(C)|}{|Keywords(A) \cup Keywords(C)|}.$$

This closeness score can be used as one of the scores from which the final proximity score for a candidate pair (A, C) is computed. The closeness score may also be calculated by applying similarity measures such as Dice or Cosine or any other appropriate similarity measure. Instead of measuring the similarity between Keywords(A) and Keywords(C), one may first form so-called "synsets" Keywords$^+$(A) and Keywords$^+$(C) obtained by enriching each of the two keyword sets with synonyms of the keywords it contains, and then apply a similarity measure to Keywords$^+$(A) and Keywords$^+$(C) rather than to the original sets. To evaluate the semantic similarities between Keywords(A) and Keywords(C) (or Keywords$^+$(A) and Keywords$^+$(C)), one may also adopt word-embedding-based similarity measures. For example, one may calculate the Word Centroid Distance by applying Cosine similarity measure to the two centroids obtained from the embedding vectors associated with the words in each of Keywords(A) and Keywords(C) (or Keywords$^+$(A) and Keywords$^+$(C)).

Another keyword-related score is related to both company and document keywords. Different document stores extract a number of characteristic keywords from documents and make them available as index terms. For a document D, denote the set of its associated index keywords by DocKeywords(D). One can then define a metric about how well a document D returned by the search engine matches a pair A and B of companies by some score function g(Keywords(A), Keywords(B), DocKeywords(D)), and then restrict the validation process to those documents for which g(Keywords(A), Keywords(B), DocKeywords(D)) is not below a certain threshold. Again, the score function g can be based on the Jaccard or other metrics, and, rather than to the sets Keywords(A), Keywords(B) and DocKeywords(D), it may be applied to embeddings that enrich these sets by synonyms of their elements.

A criterion of a very different type is a check for certain typical graph patterns in a (current) competitor graph. (See the "The Sector Compatibility Score" section for the definition of this graph.) An example of such a typical pattern, which has been used successfully in practice to identify competitors, is the pattern here called "diamond pattern". Two companies A and C appear in a so-called competitor diamond of size n, if the following holds:

There is no edge between A and C, and

There are distinct "intermediate" companies $B_1, \ldots, B_n$ such that there exists an edge from A to each $B_i$, and also an edge from each $B_i$ to C.

Here n always denotes the maximum number of intermediate companies. One can then define a score diamond(A, C) between 0 and 1 related to the presence of such a diamond pattern. For example, 0 if the pattern is absent, 0.9 if n=1, 0.95 if n=2, and 1 if n≥3. Note that, if a pair (A,C) of companies has been generated as a candidate competitor pair by the (possibly restricted) transitivity rule, then it must hold that n≥1, and thus diamond(A, C)≥0.9.

A final example of a score for a competitor pair (A, C) is related to the derivation distance between A and C relative to an originally given competitor graph. Essentially, the derivation distance dist(A, C) of a competitor pair (A, C) is the minimum number of derivation steps (i.e., rule applications) that is needed to derive (A, C) as a competitor pair, starting from the initially given CIS. As an example, the derivation distance between competitor company IDs CID1 and CID2 would be the minimum number of applications of Vadalog rules (as stated in the "Creating Competitor Candidates via Constrained Transitive Closure" section) for deriving a fact Cand(CID1,CID2,PScore) that passes all other tests and gives rise to a new tuple (CID1,CID2,fs (CID1,CID2)) of the Competitor relation. This distance may be calculated "on the fly" by the Vadalog program by a slight modification of this program and by adding a further argument position to the Cand predicate keeping track of the distance. One can then introduce a distance score which is a function mapping the distance to a number in the interval [0,1] that monotonically decreases with the distance, for example a non-linear score such as: max(0, (20−dist(A, B))/20)$^{1.5}$). Such a distance score may then be added as a new factor of the expression defining PScore in the Datalog program of the "Creating Competitor Candidates via Constrained Transitive Closure" section. Note that this program actually already penalizes higher derivation distances by subtracting a penalty constant A at every inference step. The multiplication with the distance score may be introduced either in addition or instead of the subtraction of constant A. One may instead use the distance score as an independent "semifinal" score (see the "Score Computation and Aggregation" section) that could be combined with the CLS and PScore scores (and possibly with further scores) in a similar way as is described in the "Combination of Scores and Final Selection of Competitor Pairs" section, or as outlined in the "Score Computation and Aggregation" section.

Variants of Validation Queries

When generating a query in the Competitor Validation process, only the unique main name of each constituent company is used as a search term in the query. However, a company may have different names such as its full name, short name, historically used name(s), current name(s), stock symbol, etc. Considering that different documents may use different names of the same company when mentioning the company, in some embodiments, all the names of each constituent company are combined by an operator expressing the "OR" conjunction in queries. For example, some of such embodiments may extend query templates by using all names of each constituent company. T1 may be extended to T1-extended:

$E(A_1^*)$ OR ... OR $E(A_m^*)$ $E(A)$ $E(B)$ where E(N) denotes the result of converting a search term N, i.e., the unique main name of some company N, to an expression combining all of N's different names with the OR operator:

("$N_1$" OR ... OR "$N_w$")

where $N_i$ for $1 \leq i \leq w$ is one name of N. Similar extensions are done for T1*, T2, and T2*.

Queries according to these extended query templates become lengthy, which is usually not desirable. Compared with short queries, long queries are usually slower but cost more memory during execution, and may benefit less from architectures supporting parallel queries. In some embodiments, a pre-defined number N fixes the maximum total number of search terms used in each query. Various embodiments may adopt different methods to generate short queries that do not exceed the search-term limit. In some embodiments, only a subset of each constituent company's names is used in a short query.

Some embodiments replace T1, T1*, T2 and T2* with more stringent query templates and generate more stringent queries accordingly. For example, in the query templates of some embodiments, known-competitor-based parts may adopt the logical operator AND (omitted in the template as it is the default operator of combining search terms) instead of OR to concatenate a fixed number of known competitors. As an example, T1-stringent, a more stringent version of T1, is:

"$A_1^*$" ... "$A_k^*$" "A" "B"

where $k(2 \leq k \leq m)$ is a pre-fixed number determining that k randomly-selected known competitors of A are used in each query according to T1-stringent. Observe that several different queries may be generated according to T1-stringent based on different selections of k known competitors of A.

Observe that sometimes the number of such variant queries may be too large, and the caused overhead may affect the overall execution performance of all queries. In various embodiments, different methods may be used to control the number of queries. For example, when generating queries according to a T1-extended, instead of using all known competitors of A, only a small number of randomly selected known competitors of A are used. When generating queries according to T1-stringent, instead of considering all possible selections of k known competitors of A, a pre-fixed number n determines only n queries according to T1-stringent ought to be generated.

In embodiments adopting T1-T2*'s variants described above, formulas 1 and 2 are replaced with formulas 4 and 5, where $q1_i$ and $q2_i$ have the same meanings as described in the "Step 2. Calculation of Statistics of Query Results" section, $s_1$ and $s_1^*$ are numbers of queries according to variants of T1 and T1*, and $s_2$, $s_2^*$ are numbers of queries according to variants of T2 and T2*.

$$n_1 = \frac{1}{s_1}\sum_{i=1}^{s_1}|Res(q1_i)| + \frac{1}{s_1^*}\sum_{i=1}^{s_1^*}|Res(q1_i)| \quad (4)$$

$$n_2 = \frac{1}{s_2} \sum_{i=1}^{s_2} |Res(q2_i)| + \frac{1}{s_2'} \sum_{i=1}^{s_2'} |Res(q2_i)| \quad (5)$$

Selection of Competition-Related Documents

Competition-related documents are vital in the Competitor Validation process. When validating a candidate competitor pair (A,B), queries using known competitors of A or B as search terms, together with a pre-defined denylist, are used to find competition-related Web pages. In other embodiments, some other methods may be used to check whether a document is competition-related or not.

In another embodiment which also uses the Web as the document repository, the Web search queries used in the Competitor Validation process incorporate additional competition-related keywords as search terms. For example, T1 may be revised to:

T1: "A" "B" ("A$_1$*" OR ... OR "A$_m$*")

("K$_1$" OR ... OR "K$_w$")

where each K$_i$ for 1≤i≤w denotes a competition-related keyword. Such competition-related keywords may be manually crafted or automatically generated by some NLP tool such as BERT.

In some other yet more complicated embodiments, many existing techniques including: Topic Modeling methods such as Latent Dirichlet Allocation (LDA), Topic Classification methods, Text Summarization methods, may be further applied to check if a document is competition-related or not. Depending on the actual document repository used, different approaches can be employed to reduce the computational cost required for such checking processes. When the Web is used as the document repository, checking whether a Web page is competition-related by applying the techniques mentioned above to the entire content of the Web page may be too expensive. Instead, one may apply the techniques mentioned above on the URLs, titles, and/or snippets of Web pages, which are immediately available in the search results returned by a Web search engine. When using an appropriately indexed local document repository, such a checking process can be run on the index results rather than on the entire content of each document.

Other Methods of Calculating Measurements in Competitor Validation

Recall that in the Competitor Validation process, two important measurements are estimated, CR and CLS. Various other methods of calculating CR and CLS may be used in different embodiments of the present disclosure.

Other Methods of Calculating CR

Existing works about using word occurrences in documents of a document repository (or "corpus") to develop measures for word similarity or word association can be adjusted or extended to serve the calculation of CR. An example of utilizing the Normalised Google Distance (NGD) to calculate CR is illustrated below.

The Normalised Google Distance of a pair of terms, X and Y, denoted as NGD(X,Y) is a normalized semantic distance between X and Y, usually between 0 (identical) and 1 (unrelated). It is calculated based on the page counts of the Google search results of searching for (i) Web pages containing X, obtained via submitting a query "X" to the Google Search; (ii) Web pages containing Y, obtained via submitting a query "Y" to the Google Search; (iii) Web pages containing X and Y, obtained via query "X AND Y" to the Google Search, and the number of all indexed pages by Google.

To facilitate the illustration, the term "Google Similarity Score" of two companies X and Y, denoted by G(X,Y), is used to refer to the result of 1−NGD(X,Y). Based on that, CR(A, B) is calculated by the following formulas, where A$_i$*, B$_i$*, R(A) and R(B).

$$s_1 = \left( \frac{1}{m} \sum_{i=1}^{m} G(A, A_i^*) + \frac{1}{n} \sum_{j=1}^{n} G(B, B_j^*) \right)/2 \quad (6)$$

$$s_2 = \left( \sum_{i=1}^{k} G(A, R(A)_i) + \sum_{i=1}^{k} G(B, R(B)_i) \right)/2k \quad (7)$$

$$CR(A, B) = \frac{|G(A, B) - s_1|}{|G(A, B) - s_2|} \quad (8)$$

s$_1$, the average Google Similarity Score of pairs (A, A$_i$*), for 1≤i≤m, and pairs (B, B$_j$*), for 1≤j≤n is calculated, as in Formula 6. For each competitor pair, (A, X) or (B, Y), its Google Similarity Score should be equal or close to s$_1$.

Similarly, s$_2$, the average Google Similarity Score of pairs (A, R(A)$_i$) and pairs (B, R(B)$_i$), for 1≤i≤k is calculated, as in Formula 7. Since R(A) or R(B) are randomly selected from those companies that are not known to be competitors of A or B. It is unlikely R(A) (or R(B)) happens to be a competitor of A (or B). Therefore, for each non-competitor pair, (A, X') or (B, Y'), its Google Similarity Score should be equal or close to s$_2$.

Intuitively, comparing G(A,B) with s$_1$ and s$_2$ indicates how likely A and B are competitors. The closer G(A,B) is to s$_1$, the more likely A and B are competitors. On the contrary, the closer G(A,B) is to s$_2$, the more likely A and B are not competitors. Thus, in Formula 8, CR(A,B) is calculated as a distance ratio according to the comparison of G(A,B) and s$_1$ and the comparison of G(A,B) and s$_2$.

This is an example only for showing how other measures can be used to calculate CR, while in various embodiments, many other measures may be used to calculate CR.

Other Methods of Calculating CLS

In some examples, different CR values falling within the same CR interval get an identical CLS. In some other embodiments, a more fine-grained CR-to-CLS mapping may be achieved by a function ƒ(CR) that computes a CLS according to each possible CR. ƒ(CR) may be manually crafted in some embodiments or automatically learned in some more complicated embodiments. Here an example to illustrate the latter is given. In some embodiment, ƒ(CR) is automatically learned by training an a machine learning model based on training examples in form of (CR(X,Y), isCompet(X,Y)), where CR(X,Y) is the CR of a pair of companies X and Y, isCompet(X,Y) is an integer with two possible values, 1 (indicating (X,Y) is a competitor pair), and 0 (indicating (X,Y) is a non-competitor competitor).

Each positive example in form of (CR(X,X*), 1) is generated by taking a known pair of competitors, X and X* from the CIS and calculating CR(X,X*). Each negative example in form of (CR(X,Y),0) is approximately generated by taking a pair of companies, X and Y, which is not known to be a competitor pair, and calculating CR(X,Y). To train the function ƒ(CR), many existing machine learning methods can be used, such as Logistic Regression.

Score Computation and Aggregation

One can distinguish three types of scores for competitor pairs in an embodiment for competitor generation: the final score, semi-final scores, and auxiliary scores.

The final score is the one based on which it is decided whether or not a candidate competitor pair is accepted and retained as a competitor pair.

A semi-final score is one that is directly used in the computation of the final score. As described in herein, PScore and CLS are the only semi-final scores.

An auxiliary score is one that is used for generating another score, but is not one of the scores that directly takes part in the computation of the final score. Thus, an auxiliary score influences the final score indirectly only. For example, an auxiliary score can be the sector compatibility score SeCoScore=$f^*$(SEC1,SEC3), also used in the Vadalog program of the "Creating Competitor Candidates via Constrained Transitive Closure" section CompatSec(SEC1, SEC3,SeCoScore). This score contributes to the value of the PScore score, but is not directly used in the computation of the final score in the "Combination of Scores and Final Selection of Competitor Pairs" section.

For the embodiments of this disclosure, there is a lot of leeway of how to use and combine scores and, in particular, of deciding which score is auxiliary and which semi-final. For example, one could use SeCoScore as a semi-final score. The advantage of using it as an auxiliary score in the Vadalog program of the "Creating Competitor Candidates via Constrained Transitive Closure" section is that the multiplication with SeCoScore lowers the PScore value, and thus, in practice, significantly fewer Cand facts are generated. The early elimination of solution candidates saves computing time and storage space resources, especially with a CIS such as Owler that contains data about at least 14 million companies. For other CIS that maintain information about significantly fewer companies, it may well be preferable to 'handle' SeCoScore as a semi-final score, which would allow for a clearer definition and understanding of its precise contribution to the final score.

In the rest of the present section, various ways of combining semi-final scores to a final score are outlined. There is an infinity of possible methods of aggregating scores, so, only a few examples can be given here. Assume that k scoring functions $f_1, \ldots, f_k$ are used for a candidate competitor pair (A, B) with $f_i$(A, B)=$x_i$ for $1 \leq i \leq k$. Assume, moreover that the scores $x_i, \ldots, x_k$ are all normalized to take values in the same interval [0, M], where M>0 is some maximum value, and further assume, only for illustration and simplicity, that M=1 (recall that in some examples M=100000 was chosen, which is the maximum score also used by Owler). Then, the following are examples of score aggregation methods.

Standard numeric score aggregation functions such as arithmetic mean, geometric mean, ϵ-adjusted geometric mean and its variants (for example the $\epsilon GM_{tec\_eval}$ variant), and the median.

Fuzzy aggregation functions. One may interpret each scoring function as a fuzzy membership, and one can thus aggregate the scores according to various types of fuzzy disjunction (e.g. max), which would result in higher values, and thus lead to a lower precision and a higher recall, or according to various types of fuzzy conjunction (e.g. min), which would lead to a lower precision and a higher recall, or according to other, more complex fuzzy aggregation methods.

Weighted aggregation functions. A straightforward generalization of the arithmetic mean of the scores is the weighted arithmetic mean $$\frac{\alpha_1 x_1 + \alpha_2 x_2 + \ldots \alpha_k x_k}{\alpha_1 + \alpha_2 + \ldots \alpha_k}, \quad (9)$$

where each $\alpha_i$, for $1 \leq i \leq k$, is a real-valued weight in [0,1] giving more or less importance to the corresponding score.

More generally, for obtaining a final score for a company pair (A, B), one could define a (possibly non-linear) final score function $f(\alpha_1, \ldots, \alpha_k, f_1^*(\alpha_i, A, B), \ldots, f_k^*(\alpha_k, A, B))$, where each $f_i^*$, for $1 \leq i \leq k$ is obtained from $f_i$ by using $\alpha_i$ as a (not necessarily linear) "monotonic modifier", i.e., if $\alpha_i' > \alpha_i$ then $f_i^*(\alpha_i', A, B) \geq f_i^*(\alpha_1, A, B))$, and where $f$ also takes care of the normalization, in analogy to the denominator of fraction (9), but possibly in a more complex fashion.

In the above, some or all of the weights $\alpha_1 \ldots, \alpha_k$ may be fixed manually by the system designer, or may be learnt or statistically derived from a verified data set. To illustrate the latter, assume a verified data set D containing tuples (A, B, vs(A, B)), where vs(A, B) is a verified final score for (A, B). Then for "learning" all factors $\alpha_1, \ldots, \alpha_k$, one could, for example, first define for each tuple (A, B, vs(A, B)) in D a loss function test$_{(A,B)}(\alpha_1, \ldots \alpha_k)$=|vs(A, B)−$f(\alpha_1, \ldots, \alpha_k, f_1^*(\alpha_i, A, B), \ldots, f_k^*(\alpha_k, A, B))$|, and then obtain the values for $\alpha_1, \ldots \alpha_k$ by $$\underset{\alpha_1, \ldots, \alpha_k \in [0,1]}{\operatorname{argmin}} \sum_{(A,B,vs(A,B)) \in D} test_{(A,B)}(\alpha_1, \ldots, \alpha_k),$$

which minimizes the total deviation from the test set scores. Of course, some more sophisticated methods, e.g., related to least squares fitting, may be used. The values $\alpha_1, \ldots, \alpha_k$, or some of them, if the others are manually fixed, may be obtained by gradient descent or other machine learning optimization strategies (e.g., Stochastic Gradient Descent).

Ranking-based aggregation. Each scoring function $f_i$ determines a ranking among all considered candidate competitor pairs. There are many methods for aggregating multiple rankings into a unique ranking, often referred to as "rank aggregation". Some of these methods take the score-values into account, others only use the score-induced rankings. To produce final scores and to select competitor pairs from candidate pairs, one can thus proceed as follows: (i) generate an aggregate ranking of the candidate pairs from the rankings induced by the score functions $f_1, \ldots, f_k$ according to one of the ranking-based aggregation methods; (ii) select K top-ranked candidate pairs, where K is determined by a cutoff-constant for an aggregate score already provided with the aggregate-ranking method, or where K is determined by other criteria, such as the top 40% of all ranked pairs; (iii) add a final score to each selected competitor pair (A, B) either by taking the score provided by the aggregate ranking method (if provided) or by computing a score based on the position of (A, B) in the final ranking, e.g., by attributing a score of 1 to the highest ranked, a score of 0.6 to the lowest ranked, linearly interpolated values to all other selected pairs. This is of course just one example, and there are myriads of other methods of computing scores from rankings.

Aggregating selected scores. If there are several scores, a scoring function may be made robust to outliers, for example, by (a) disregarding the lowest score or (b) disregarding the highest score or (c) disregarding the lowest score and the highest score or (d) replacing the highest score, the lowest score or both the highest and the lowest scores by the average of the other scores.

Dealing with absent scores. Sometimes, one or more of the scores cannot or should not be computed, for instance, in case of missing CIS data. For example, a keyword score should not be computed if there are no keywords at all associated with a company. The above mentioned and other aggregation methods may be adapted to such cases, for example, by replacing non-available scores with the arithmetic or geometric mean of the computable scores. Given that more scores lead to a more reliable result, one may penalize the lack of scores, for example by applying for each missing score a penalty factor such as, for example, 0.95 or the subtraction of a penalty constant such as, for example, 0.03, to the aggregated score in order to obtain the final score.

Crowd verification. Finally, once the aggregated score has been computed, in some embodiments, either all new competitor pairs (or candidate competitor pairs), or only those whose scores that are a certain percentage below the final acceptance threshold (say, within a margin of 20% of this threshold) are sent together with their final score, or with their semifinal and final scores and possibly other information (company names and and/or other attributes), to human verifiers belonging to a crowd of experts, who make a final yes/no decision of whether the pair should be accepted, and who possibly also alter the final score.

The system may include a computing system, which can be for example any computing device, or any component thereof in which the components of the system are in communication with each other using a connection. The connection can be a physical connection via a bus, or a direct connection into a processor, such as in a chipset architecture. The connection can also be a virtual connection, networked connection, or logical connection.

In some embodiments, the computing system is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

The example system includes at least one processing unit (CPU or processor) and the connection that couples various system components including system memory, such as read-only memory (ROM) and random access memory (RAM) to the processor. The computing system can include a cache of high-speed memory connected directly with, in close proximity to, or integrated as part of the processor.

The processor can include any general purpose processor and a hardware service or software service, such as services stored in storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

To enable user interaction, the computing system includes an input device, which can represent any number of input mechanisms, such as a microphone for speech, a touch-sensitive screen for gesture or graphical input, keyboard, mouse, motion input, speech, etc. The computing system can also include an output device, which can be one or more of a number of output mechanisms known to those of skill in the art.

In some instances, multimodal systems can enable a user to provide multiple types of input/output to communicate with the computing system. The computing system can include a communications interface, which can generally govern and manage the user input and system output. There is no restriction on operating on any particular hardware arrangement, and therefore the basic features here may easily be substituted for improved hardware or firmware arrangements as they are developed.

A storage device can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device can include software services, servers, services, etc., that when the code that defines such software is executed by the processor, it causes the system to perform a function. In some embodiments, a hardware service that performs a particular function can include the software component stored in a computer-readable medium in connection with the necessary hardware components, such as the processor, the connection, the output device, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A method of determining pairs of competing companies comprising:
   (i) accessing, by at least one processor, a company information system (CIS) and retrieving data from the CIS, the CIS storing data regarding companies comprising business entities, institutions, and organisations in non-transitory memory;
   (ii) determining, by the at least one processor, candidate competitor pairs of companies from already established competitor pairs stored in, and retrieved from, the CIS, and from other data stored in, and retrieved from, the CIS, and determining for each candidate competitor pair (company A, company C) one or more semi-final plausibility scores according to one or more criteria, each semi-final plausibility score for (company A, company C) expressing a degree of plausibility that company C is a competitor of company A;
   (iii) validating, by the at least one processor, candidate competitor pairs by accessing a searchable document store and performing searches to obtain for each candidate competitor pair statistics based on frequencies of co-occurrences in documents of the document store of names of two companies in the competitor pair, the frequencies determined from numbers or from sets of identifiers of result documents for search queries issued to the document store, and determining a co-occurrence-based competition likelihood score (CLS) expressing a degree of relatedness of the companies relative to the co-occurrences in documents of the document store; and
   (iv) aggregating, by the at least one processor, for each candidate competitor pair the one or more semi-final plausibility scores with the CLS to obtain a final plausibility score and selecting candidate competitor pairs as effective competitor pairs, having a final plausibility score that is in a predefined range of final plausibility scores,
      where at least one candidate competitor pair is determined by applying restricted transitivity, whereby the candidate competitor pair (company A, company C) is generated from already established competitor pairs (company A, company B) and (company B, company C) that fulfill additional constraints, where at least one of the additional constraints comprises:
   (i) company A and company C are in a same industrial sector;
   (ii) company A is in a sector that is compatible with a sector associated with company C; and
   (iii) sets of keywords associated to company A and to company B are sufficiently similar,
      where, by applying the restricted transitivity, a proximity score (PScore) to the competitor candidate pair (company A, company C) is determined, the PScore expressing the plausibility of company A and company C being competitors based on the data retrieved from the CIS,
      where the CLS of each candidate competitor pair (company A, company C) is determined based on a comparison of a number of search results of groups of queries to the document store comprising: (i) first queries for co-occurrences of names of A and of C together with names of some competitors of A or some competitors of C, (ii) second queries, corresponding to the first queries, where either A or C is replaced by random companies from the CIS not known to be in a competitor relationship with A or C, respectively, whereby a higher CLS is achieved if an average number of search results by the first queries is higher than an average number of search results by the second queries,
      where aggregating the PScore, the CLS, and the semi-final plausibility scores to compute the final plausibility score is based on normalizing to a same numeric range, and then applying at least one of:
   (i) standard numeric score aggregation functions comprising arithmetic mean, geometric mean and its variants, or the median,
   (ii) fuzzy aggregation functions, when semi-final scoring functions are interpreted as membership functions in a fuzzy set,
   (iii) weighted aggregation functions whose weight is at least one of fixed manually, automatically computed, and learnt from data in the CIS,
   (iv) ranking-based aggregation functions which produce an aggregate ranking from the rankings induced by the single scores, and where a final plausibility score is determined from the aggregate ranking, possibly also considering the various scores, (v) obtaining a more robust final scoring with respect to outlier scores, by aggregating a subset of the scores to compute the final plausibility score, by a score computation method comprising (a) disregarding a lowest score, (b) disregarding a highest score, (c) disregarding the lowest score and the highest score, (d) replacing the highest score, the lowest score, or both the highest and the lowest score by the arithmetic or geometric mean or an adjusted geometric mean or the median of other scores, and (vi) in case of missing CIS data, replacing non-available score values by the arithmetic or geometric mean or an adjusted geometric mean or the median of the available scores, and, where appropriate, applying a penalty to the semi-final plausibility score to obtain the final plausibility score.

2. The method of claim 1 where the CIS comprises at least one of:
(a) one or more database management systems, (b) knowledge bases that store facts and rules in logical form, (c) first knowledge graphs, which are knowledge bases that express and store knowledge in a graph-structured format comprising RDF, and (d) second knowledge graphs that are knowledge bases organized as networks of entities, and instances for those entities, describing real world objects and their interrelations, with specific reference to a domain or to an organization.

3. The method of claim 1 where the CIS comprises crowd-sourced data.

4. The method of claim 1 where the CIS comprises the Owler Competitive Graph.

5. The method of claim 1, where the CIS comprises at least one of:
(a) the World Wide Web, (b) a searchable corpus comprising at least one of news items, texts, and web pages, indexed with keywords and other relevant data, (c) an intranet or a federation of intranets, (d) a document management system, (e) an electronically searchable document or library catalog with links to online documents or to electronically stored documents, (f) a full-text database, (g) a database that stores text fields and that can retrieve texts via a suitable query language, (h) a searchable content management system, (i) a social network, where user posts are regarded as documents, and (j) a log management system of search queries.

6. The method of claim 1, where the candidate competitor pairs are determined by applying at least one rule that expresses application domain knowledge regarding company properties and relationships.

7. The method of claim 1, where data items stored in the CIS are interpreted as logical facts, and where the candidate competitor pairs are determined by logical rules using an inference engine.

8. The method of claim 7, where both the logical facts that interpret CIS data items and the logical rules belong to a same logical formalism, whereby a uniform method of data access and rule processing appropriate for the inference engine is provided and Used.

9. The method of claim 7, where the logical rules are expressed in a formalism using at least one of:
(a) a logic programming language comprising one of Prolog, Datalog, and Vadalog, (b) answer set programming, (c) a logical database query language, (d) a logical knowledge graph query language based on tuple-generating dependencies, (e) a database query language, where queries are regarded as rules, (f) any of the above formalisms syntactically and semantically extended by one or more inference features in the group consisting of: fuzzy logical inference, probabilistic inference, many-valued inference, higher-order logical inference, inference with incomplete information, uncertain inference, disjunctive inference, temporal inference, and inference with built-in generalized quantifiers, (g) one or a combination of the above formalisms further extended by arithmetical and/or statistical aggregate functions, and (h) one or a combination of the above formalisms further extended by interfaces to external software resources, where such interfaces can be addressed and used via special predicates, and where the inference engine infers new facts from a set of facts and rules expressed in the formalism.

10. The method of claim 1, further comprising determining the frequencies by disregarding identifiers of result documents that are included in a predefined denylist of document identifiers, and documents known to be irrelevant are disregarded when determining the competition likelihood score.

11. The method of claim 1, where at least one candidate competitor pair is determined by applying at least one of the following types of rules:
(i) restricted transitivity, whereby from already established competitor pairs (company A, company B) and (company B, company C) that fulfill some additional constraints, the candidate competitor pair (company A, company C) is generated; and
(ii) restricted symmetry, whereby from an already established competitor pair (company A, company B) that fulfills additional constraints, the candidate competitor pair (company B, company A) is generated.

12. The method of claim 1, where the PScore for the pair (company A, company C) comprises at least one of:
(i) already established PScores of competitor pairs (company A, company B) and (company B, company C),
(ii) the PScores of already established competitor pairs (company A, company B') and (company B', company C), where B' is some company,
(iii) a sector compatibility score for (company A, company C), which is the maximum overall sector compatibility scores of pairs of industry sectors (SA,SC), such that SA and SC are industry sectors associated in the CIS for company A and company C, respectively, and where the sector compatibility scores for each pair of industry sectors is predetermined,
(iv) a keyword proximity score, indicating closeness between the sets of keywords associated with company A and with company C, where the Jaccard, Dice, or Cosine similarity measure or another appropriate similarity measure is used, and
(v) a derivation distance.

13. The method of claim 12 where sector compatibility scores between two industry sectors S1 and S2 are determined statistically from the data from the CIS, based on the relative frequency of competitor company pairs (C1,C2) in the CIS, having as industry sectors S1 and S2, respectively.

14. The method of claim 1, where the semi-final plausibility scores comprise one or more of the following scores:
(i) if not already used for the computation of the PScore of (A,C), a sector compatibility score for (company A, company C), which is a maximum overall sector compatibility score of pairs of industry sectors (SA,SC), such that SA and SC are industry sectors associated in the CIS to company A and company C, respectively, and where the sector compatibility scores for each pair of industry sectors is pre-computed, (ii) if not already used for the computation of the PScore of (A,C), a keyword proximity score, indicating the closeness between the sets of keywords associated with company A and with company C, where the Jaccard, Dice, or Cosine similarity measure or another appropriate similarity measure is used, (iii) a graph pattern score based on a presence of certain graph patterns involving company A and company C in the competitor graph, which is the directed graph obtained from the CIS, whose vertices are the companies stored in the CIS, and whose edges are pairs (A,B) of companies such that B is a competitor of A according to the CIS, and (iv) a score for a derivation distance of the pair (company A, company C), the derivation distance being a minimum number of rule-based derivation steps necessary to derive (company A, company C) from the CIS.

15. The method of claim 14 where sector compatibility scores between two industry sectors S1 and S2 are determined statistically from the data from the CIS, based on a relative frequency of competitor company pairs (C1,C2) in the CIS, having as industry sectors S1 and S2, respectively.

16. The method of claim 14, where one of the graph patterns is a pattern referred to as "diamond pattern" where two companies A and C are related by this pattern if:

there is no edge between A and C in the competitor graph, and there are distinct "intermediate" companies B1, . . . , Bn, such that there exists for each i from 1 to n an edge from A to Bi, and also an edge from Bi to C, where n denotes a maximum number of intermediate companies; and where a graph pattern score is higher for larger n.

17. The method of claim 1, where each document resulting from a query to the document store is disregarded when the closeness according to a keyword proximity score between the set of keywords for the document provided by the document store and the set of keywords associated with companies occurring in the query is less than a predetermined constant.

18. The method of claim 1, where each query in the first queries and the second queries is enhanced by adding competition-related keywords as search terms to the query.

19. The method of claim 1, where query group (i) comprises in addition, or is replaced by other types of queries comprising third queries of at least one of:

(a) queries for documents comprising names of company A, (b) queries for documents comprising names of company B, (c) queries for documents comprising co-occurrences of names of company A and of company B, and where the second queries comprise in addition, or are replaced by the third queries, where company A or company B is replaced by random companies from the CIS not known to be in a competitor relationship with company A or company B, respectively.

20. The method of claim 1, where numbers of search results of the first queries and numbers of search results of the second queries are used to determine various scores which jointly determine a CLS.

21. A system to determine pairs of competing companies comprising:

at least one processor to:

(i) access a company information system (CIS) and retrieve data from the CIS, the CIS storing data regarding companies comprising business entities, institutions, and organisations in non-transitory memory;

(ii) determine candidate competitor pairs of companies from already established competitor pairs stored in, and retrieved from, the CIS, and from other data stored in, and retrieved from, the CIS, and determining for each candidate competitor pair (company A, company C) one or more semi-final plausibility scores according to one or more criteria, each semi-final plausibility score for (company A, company C) expressing a degree of plausibility that company C is a competitor of company A;

(iii) validate candidate competitor pairs by accessing a searchable document store and performing searches to obtain for each candidate competitor pair statistics based on frequencies of co-occurrences in documents of the document store of names of two companies in the competitor pair, the frequencies determined from numbers or from sets of identifiers of result documents for search queries issued to the document store, and determine a co-occurrence-based competition likelihood score (CLS) expressing a degree of relatedness of the companies relative to the co-occurrences in documents of the document store; and (iv) aggregate for each candidate competitor pair the one or more semi-final plausibility scores with the CLS to obtain a final plausibility score and select candidate competitor pairs as effective competitor pairs, having a final plausibility score that is in a predefined range of final plausibility scores, where at least one candidate competitor pair is determined by applying restricted transitivity, whereby the candidate competitor pair (company A, company C) is generated from already established competitor pairs (company A, company B) and (company B, company C) that fulfill additional constraints, where at least one of the additional constraints comprises:

(i) company A and company C are in a same industrial sector;

(ii) company A is in a sector that is compatible with a sector associated with company C; and (iii) sets of keywords associated to company A and to company B are sufficiently similar, where, by applying the restricted transitivity, a proximity score (PScore) to the competitor candidate pair (company A, company C) is determined, the PScore expressing the plausibility of company A and company C being competitors based on the data retrieved from the CIS, where the CLS of each candidate competitor pair (company A, company C) is determined based on a comparison of a number of search results of groups of queries to the document store comprising: (i) first queries for co-occurrences of names of A and of C together with names of some competitors of A or some competitors of C, (ii) second queries, corresponding to the first queries, where either A or C is replaced by random companies from the CIS not known to be in a competitor relationship with A or C, respectively, whereby a higher CLS is achieved if an average number of search results by the first queries is higher than an average number of search results by the second queries, where aggregating the PScore, the CLS, and the semi-final plausibility scores to compute the final plausibility score is based on normalizing to a same numeric range, and then applying at least one of:

(i) standard numeric score aggregation functions comprising arithmetic mean, geometric mean and its variants, or the median, (ii) fuzzy aggregation functions, when semi-final scoring functions are interpreted as membership functions in a fuzzy set, (iii) weighted aggregation functions whose weight is at least one of fixed manually, automatically computed, and learnt from data in the CIS, (iv) ranking-based aggregation functions which produce an aggregate ranking from the rankings induced by the single scores, and where a final plausibility score is determined from the aggregate ranking, possibly also considering the various scores, (v) obtaining a more robust final scoring with respect to outlier scores, by aggregating a subset of the scores to compute the final plausibility score, by a score computation method comprising (a) disregarding a lowest score, (b) disregarding a highest score, (c) disregarding the lowest score and the highest score, (d) replacing the highest score, the lowest score, or both the highest and the lowest score by the arithmetic or geometric mean or an adjusted geometric mean or the median of other scores, and (vi) in case of missing CIS data, replacing non-available score values by the arithmetic or geometric mean or an adjusted geometric mean or the median of the available scores, and, where appropriate, applying a penalty to the semi-final plausibility score to obtain the final plausibility score.

22. A non-transitory computer-readable storage medium, having instructions stored thereon that, when executed by at least one computing device cause the at least one computing device to perform operations, the operations comprising:

(i) accessing a company information system (CIS) and retrieving data from the CIS, the CIS storing data regarding companies comprising business entities, institutions, and organisations in the non-transitory computer-readable storage medium;

(ii) determining candidate competitor pairs of companies from already established competitor pairs stored in, and retrieved from, the CIS, and from other data stored in, and retrieved from, the CIS, and determining for each candidate competitor pair (company A, company C) one or more semi-final plausibility scores according to one or more criteria, each semi-final plausibility score for (company A, company C) expressing a degree of plausibility that company C is a competitor of company A;

(iii) validating candidate competitor pairs by accessing a searchable document store and performing searches to obtain for each candidate competitor pair statistics based on frequencies of co-occurrences in documents of the document store of names of two companies in the competitor pair, the frequencies determined from numbers or from sets of identifiers of result documents for search queries issued to the document store, and determining a co-occurrence-based competition likelihood score (CLS) expressing a degree of relatedness of the companies relative to the co-occurrences in documents of the document store; and (iv) aggregating for each candidate competitor pair the one or more semi-final plausibility scores with the CLS to obtain a final plausibility score and selecting candidate competitor pairs as effective competitor pairs, having a final plausibility score that is in a predefined range of final plausibility scores, where at least one candidate competitor pair is determined by applying restricted transitivity, whereby the candidate competitor pair (company A, company C) is generated from already established competitor pairs (company A, company B) and (company B, company C) that fulfill additional constraints, where at least one of the additional constraints comprises:

(i) company A and company C are in a same industrial sector;

(ii) company A is in a sector that is compatible with a sector associated with company C; and (iii) sets of keywords associated to company A and to company B are sufficiently similar, where, by applying the restricted transitivity, a proximity score (PScore) to the competitor candidate pair (company A, company C) is determined, the PScore expressing the plausibility of company A and company C being competitors based on the data retrieved from the CIS, where the CLS of each candidate competitor pair (company A, company C) is determined based on a comparison of a number of search results of groups of queries to the document store comprising: (i) first queries for co-occurrences of names of A and of C together with names of some competitors of A or some competitors of C, (ii) second queries, corresponding to the first queries, where either A or C is replaced by random companies from the CIS not known to be in a competitor relationship with A or C, respectively, whereby a higher CLS is achieved if an average number of search results by the first queries is higher than an average number of search results by the second queries, where aggregating the PScore, the CLS, and the semi-final plausibility scores to compute the final plausibility score is based on normalizing to a same numeric range, and then applying at least one of:

(i) standard numeric score aggregation functions comprising arithmetic mean, geometric mean and its variants, or the median, (ii) fuzzy aggregation functions, when semi-final scoring functions are interpreted as membership functions in a fuzzy set, (iii) weighted aggregation functions whose weight is at least one of fixed manually, automatically computed, and learnt from data in the CIS, (iv) ranking-based aggregation functions which produce an aggregate ranking from the rankings induced by the single scores, and where a final plausibility score is determined from the aggregate ranking, possibly also considering the various scores, (v) obtaining a more robust final scoring with respect to outlier scores, by aggregating a subset of the scores to compute the final plausibility score, by a score computation method comprising (a) disregarding a lowest score, (b) disregarding a highest score, (c) disregarding the lowest score and the highest score, (d) replacing the highest score, the lowest score, or both the highest and the lowest score by the arithmetic or geometric mean or an adjusted geometric mean or the median of other scores, and (vi) in case of missing CIS data, replacing non-available score values by the arithmetic or geometric mean or an adjusted geometric mean or the median of the available scores, and, where appropriate, applying a penalty to the semi-final plausibility score to obtain the final plausibility score.

\* \* \* \* \*